United States Patent
Hadingham et al.

(10) Patent No.: US 7,373,325 B1
(45) Date of Patent: May 13, 2008

(54) AUTOMATED TRADING FOR E-MARKETS

(75) Inventors: Robert G Hadingham, Harlow (GB);
Philip J Buckle, Ware (GB);
Christopher M. Newland, Hemel Hempstead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 846 days.

(21) Appl. No.: 09/688,289

(22) Filed: Oct. 13, 2000

(51) Int. Cl.
*G06Q 30/00* (2006.01)

(52) U.S. Cl. .................. 705/37; 705/26; 705/35; 705/36; 705/37; 705/38; 705/80

(58) Field of Classification Search ............ 705/35–37, 705/26, 27, 80, 38
See application file for complete search history.

(56) References Cited

U.S. PATENT DOCUMENTS

| | | | |
|---|---|---|---|
| 5,794,207 A | | 8/1998 | Walker et al. |
| 5,873,071 A | * | 2/1999 | Ferstenberg et al. .......... 705/37 |
| 6,035,288 A | * | 3/2000 | Solomon ...................... 705/37 |
| 6,058,379 A | * | 5/2000 | Odom et al. ................... 705/37 |
| 6,236,977 B1 | * | 5/2001 | Verba et al. ................... 705/10 |
| 6,260,024 B1 | * | 7/2001 | Shkedy ......................... 705/37 |
| 6,401,080 B1 | * | 6/2002 | Bigus et al. ................... 705/37 |
| 6,415,270 B1 | * | 7/2002 | Rackson et al. .......... 705/36 R |
| 6,536,935 B2 | * | 3/2003 | Parunak et al. ................ 700/99 |
| 6,553,347 B1 | * | 4/2003 | Tavor et al. ................... 705/14 |
| 6,598,026 B1 | * | 7/2003 | Ojha et al. ..................... 705/26 |
| 6,647,373 B1 | * | 11/2003 | Carlton-Foss ................. 705/37 |
| 6,687,682 B1 | * | 2/2004 | Esfandiari et al. ............ 705/37 |
| 6,704,716 B1 | * | 3/2004 | Force .......................... 705/80 |
| 6,868,400 B1 | * | 3/2005 | Sundaresan et al. .......... 705/37 |
| 6,871,190 B1 | * | 3/2005 | Seymour et al. .............. 705/37 |
| 6,871,191 B1 | * | 3/2005 | Kinney et al. ................. 705/37 |
| 6,886,000 B1 | * | 4/2005 | Aggarwal et al. ............. 705/80 |
| 6,952,682 B1 | * | 10/2005 | Wellman ....................... 705/37 |
| 6,976,005 B1 | * | 12/2005 | Bansal et al. .................. 705/26 |
| 7,249,085 B1 | * | 7/2007 | Kinney et al. ................. 705/37 |
| 2002/0058532 A1 | * | 5/2002 | Snelgrove et al. .......... 455/557 |

OTHER PUBLICATIONS

Barua et al., "Efficient selection of suppliers over the Internet", Journal of Management Information Systems, v13, n4, pp. 117-137, Spring 1997.*
Allen et al., "Utility dot.com/future", Electric Perspectives, v25, n4, pp. 22-38, Jul./Aug. 2000.*
"Design, development and validation of an agent-based model of electronic auctions", Information Technology and Management, v7, n3, p. 191, Sep. 2006.*
Akula, "Two-level workload characterization of online auctions", Electronic Commerce Research & Applications, v6, n2, pp. 192-208, Summer 2007.*

* cited by examiner

*Primary Examiner*—Nga Nguyen
(74) *Attorney, Agent, or Firm*—Barnes & Thornburg LLP

(57) ABSTRACT

A system for use on an electronic network for negotiating contracts between at least one buyer and at least one seller, in which proposals may be made or called for by buyers and/or sellers, and in which each party is represented by a software agent.

18 Claims, 9 Drawing Sheets

AUTOMATED TRADING FOR E-MARKETS

This invention relates to systems, methods and apparatus for bi-lateral electronic commerce, and is particularly useful on the Internet. It also lends itself well to the automation of reverse auction contracts, and to the automation of purchases collectively from co-operating buyers. It results from developments of our earlier work on automated agent-based negotiation, disclosed in our UK Patent Application No. 9907477.5 (10187 ID: Buckle, P. J. filed on 31 Mar. 1999).

The purpose of the present invention is to improve electronic commerce, particularly although not exclusively on the Internet. The development of intelligent software agents has led to possibilities for automating reverse auction and collective buying, for example, which were not previously possible in practical terms. For example, U.S. Pat. No. 5,794,207 entitled "Method and Apparatus for a Cryptographically Assisted Commercial Network System designed to Facilitate Buyer-Driven Conditional Purchase Office" assigned to Walker Asset Management Limited Partnership discloses bi-lateral buyer-driven commerce in a network, but does not assist the users of the system in the selection or negotiation processes sufficiently to make the e-commerce system practicable for any large number of parties.

A reverse auction is an e-commerce system in which a buyer provides a request-for-proposal (RFP) for an item that he wishes to purchase; multiple suppliers then provide closed offers or bids, from which the buyer then selects the best. The variation involves buyers agents collaborating to provide a bulk order, which then attracts a bigger discount from the suppliers when the suppliers bid. Both these variations of reverse auction can be automated and mediated using software agent technology, in accordance with the present invention, and also it is now possible to negotiate the contracts automatically, rather than accepting only single closed bids. The invention is applicable to all transactions electronically, and these are referred to as e-commerce; they include the buying and selling of items such as consumer goods, or services and network resources such as bandwidth in a telecommunications context, or a virtual private network. Without the Internet software agents and automated negotiation, this type of e-commerce would only be achievable on a much smaller scale.

One reverse auction system has already been proposed which would operate with a minimum of 400 suppliers of different consumer goods, but it is anticipated that this would be a huge administrative burden on suppliers, who would also suffer low margins and low success rates. The present invention would, by providing automated negotiation, allow such suppliers to use dynamic pricing without the need to disclose a fixed price list, which is a problem for existing Internet retailers not wanting customers to make unfavourable comparisons. Prices can be set according to delivery time required, quantity, supply in stock, and ability to respond, which allows supplier differentiation by the consumers. There are also some existing services for consolidated bulk-buying, allowing buyers to co-operate to get better deals, but again the drawback with such systems is the associated administration, together with the delays inherent in the completion of transactions. Automation is required, and is achievable with the present invention, to vastly reduce administrative overheads, speed up transaction times, and to allow many more transactions to be completed successfully.

Accordingly, the present invention provides a system for use on an electronic network for negotiating contracts between at least one buyer and at least one seller, in which proposals may be made or called for by buyers and/or sellers, and in which each party is represented by a software agent.

The invention also provides a software agent for a party conducting e-commerce, comprising a transaction engine; a negotiation engine driven by the transaction engine; and a store of a plurality of negotiation profiles; and control means responsive to the commercial situation or state of the party to select the optimal negotiation profile appropriate to that situation or state, and to cause the transaction engine to initiate or conduct e-commerce negotiations using the negotiation engine programmed with the selected negotiation profile.

The invention also provides a method of performing automated reverse auction on an electronic network using software agents for buyers and sellers.

The invention also provides a method of automated bi-lateral negotiation in which buyers' agents co-operate to produce a call for proposal to purchase collectively from one or more seller.

The invention also provides an intermediate re-selling software agent for use on an electronic network for negotiating contracts between at least one buyer and at least one seller, by purchasing from a seller and re-selling it to a buyer.

The invention also provides an intermediate negotiation system for e-commerce comprising multiple software agents capable of being engaged by buyers and/or sellers, and an interface for negotiating contracts between respective agents of at least one buyer and at least one seller.

The invention also includes communications networks incorporating such inventions, and programs for creating such systems or agents.

In order that the invention may be better understood, flexible agent-based negotiators will be described, reproducing some of the content of the aforesaid UK Application No. 9907477.5; and the developments in accordance with the present invention will also be illustrated, by way of example only, in a preferred embodiment; with reference to the accompanying drawings, of which:

FIGS. 1 to 4 are those of the aforementioned UK Application No. 9907477.5, in which FIG. 1 shows an example of negotiation structure;

FIG. 2 shows an example of a negotiation protocol;

FIG. 3 shows a second view of a negotiation protocol and

FIG. 4 shows an example of mapping qualitative issues to a value system.

By way of background to the invention, flexible agent based negotiators will now be described with reference to FIGS. 1 to 4, by reproducing part of the content of the aforesaid Application No. 9907477.5.

A first example embodiment is based on the use of negotiations to co-ordinate the dynamic provisioning of resources for a Virtual Private Network (VPN) for end users. This service is provided to the users by service and network providers. The arrangement is made up of a number of agents which represent the users, service and network providers.

Figure 1:
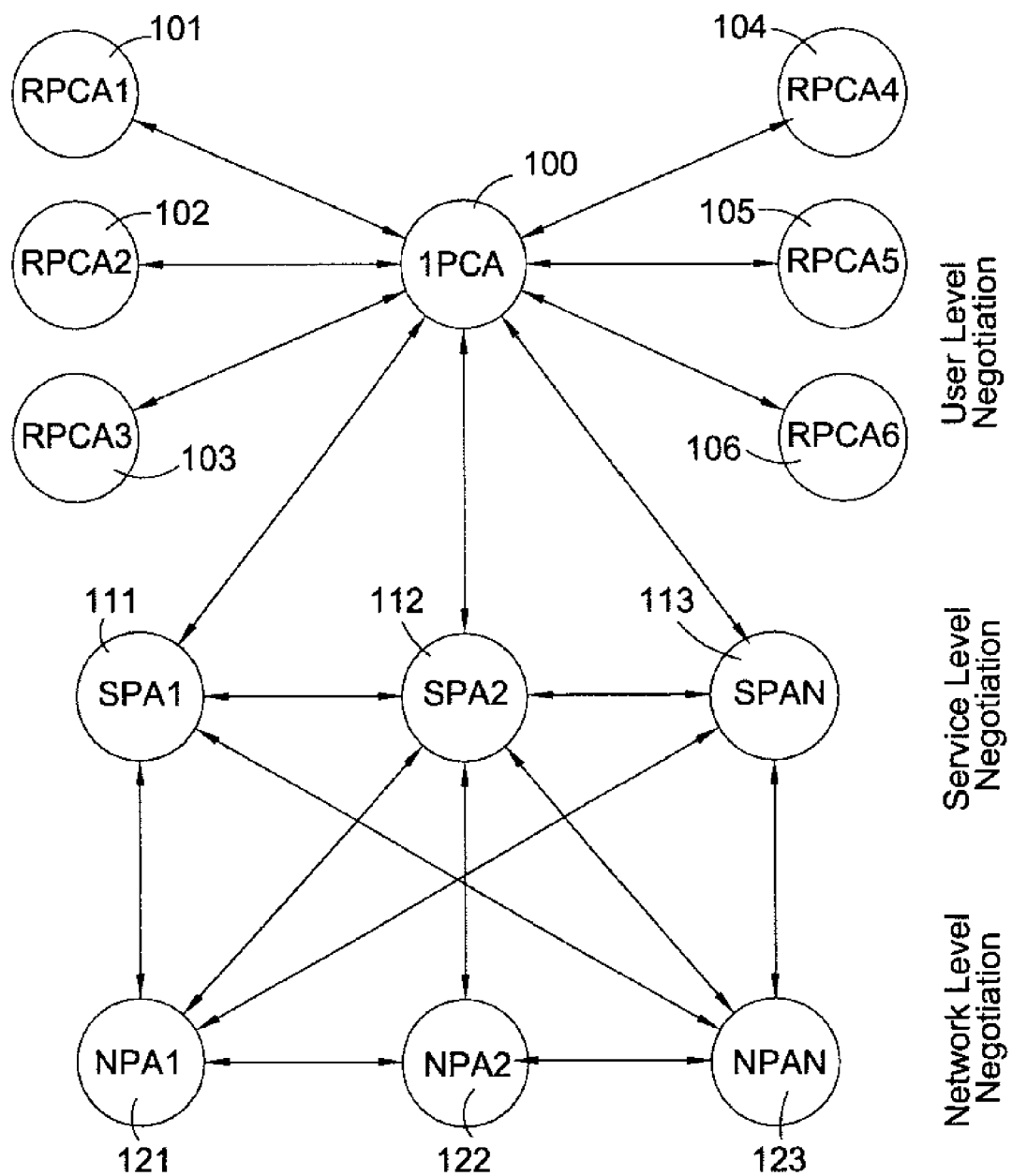

Referring now to FIG. 1, users are represented by user agents, which are collectively referred to, as Personal Communication Agents, or PCAs. The PCA are either Initiating Personal Communication Agents, (IPCAs) 100 representing the user who has the desire to initiate the meeting, or Receiving Personal Communication Agents (RPCAs) 101-106, representing the party/parties who are required to attend the meeting, respectively. The interactions between these PCAs can be multilateral (involving one IPCA and multiple RPCAs) and are centred around negotiation over meeting scheduling, where each agent negotiates on behalf of its user and where the goal is to establish the most appropriate time and security level for the service requested by the IPCA. The set of issues over which PCA agents negotiate consists of Service-Type, Security, Price, Start-Time, and Duration, where Service-Type denotes the choice of the service (eg. Video, audio or mixture thereof), Price is the share of the price the agents should pay for the service, Start-Time is the time the service will commence and Duration is the length of the service respectively. The Security issue encodes the privacy of the meeting and is represented by both the method of security (e.g. in the order of value to PCAs, Entrust, Verisign or Microsoft) and the level of security method (again in the order of value, confidentiality, integrity and confidentiality).

IPCA and RPCA requirements are constrained by what resources are available at the network domain level. For example, the network may be heavily loaded at the time the service is required by the PCAs. Since the network is only visible to the IPCA through the Service Provider Agents (SPAs) 111-113, the thread of IPCA and RPCAs negotiation is executed in parallel with negotiation between IPCA and SPAs. The interactions between IPCA and SPA directly influence the meeting scheduling negotiations between IPCA and RPCAs. In this example service level negotiation between IPCA and SPAs is assumed to be bilateral. However, each SPA agent can make agreements with IPCA for services and outsource these commitments by initiating negotiation with other SPAs for services. The set of issues in the negotiation between IPCA and SPAs is the same as the meeting scheduling negotiation thread between IPCA and RPCAs with an additional element Participants which is the list of users (represented by RPCAs) specified to be included in the requested service.

Either concurrently or after the service is provisioned between IPCA and SPA and the Network Provider Agents (NPAs) 121-123 which manage the infrastructure and low level aspects of the IP network. This thread of interaction is multilateral since each NPA manages only a subset of the IP network. Therefore the SPA must negotiate with a number of NPAs in order to secure resources for services it provides to IPCA. The set of issues in the thread of negotiation between SPA and NPAs is made up of the following elements: Quality-of-Service, Security, Participants, Price, Start-Time and Duration. Quality-of-Service (QoS) represents the "goodness" of the service from an agent's perspective. QoS may be composed of a number of sub issues such as the Bandwidth (the capacity of the link), the latency (the delay imposed by the network on packets), the jitter (the maximum time deviation acceptable during transmission), the availability (percentage of the time over which the service is required) and packet loss (percentage of the total packets lost during the lifetime of the provisioned service).

Negotiation, in the scenario described above exhibits the following characteristics.

Agents negotiate for services. Services have a number of features/issues associated to them (e.g. their Price, Duration etc.), some of which can be dynamically introduced and retracted (eg. Qos), and successful negotiation involves resolution of these issues to the satisfaction of all parties involved.

Since agents are autonomous, the factors which influence their negotiation stance and behaviour are private and not available to other parties. Thus agents do not know what utilities their opponents place on various outcomes; they do not know what reasoning models they employ; they do not know their opponent's constraints; and they do not know whether an agreement is even possible at the outset (i.e. the participants may have non-intersecting ranges of acceptable outcomes).

Since plans and execution of services/activities are real time and dependent on one another, the provisioning process should respect the time and resource levels of the agents—negotiation should be responsive to the time and resource levels of the agent. For example, if the operating environment can afford it (in terms of time, resources, etc.) then an agent may decide to engage in complex deliberation procedures involving a more refined search of the space of possible outcomes. For instance, SPA and NPA agents can engage in costly computation and selection procedures for contracts that manipulate or trade off the set of issues involved in negotiation. Alternatively, as the environment changes (e.g. deadline to reach an agreement is approaching fast, resource usage for negotiation has reached some critical level, or the other agent is exhibiting a reluctance to change its offer, etc.) then one or both of the agents may begin to adopt a more responsive attitude towards their environment by conceding. Thus responsive behaviours are similar to reactive behaviours which consider environmental conditions and are simple and uncostly responses to the environment.

Co-ordinated behaviour during negotiation is enforced through the normative rules of the negotiation protocol. This example is restricted to bilateral negotiations but multilateral negotiations have been shown to be equivalent to a series of bi-lateral negotiations.

Figure 2:
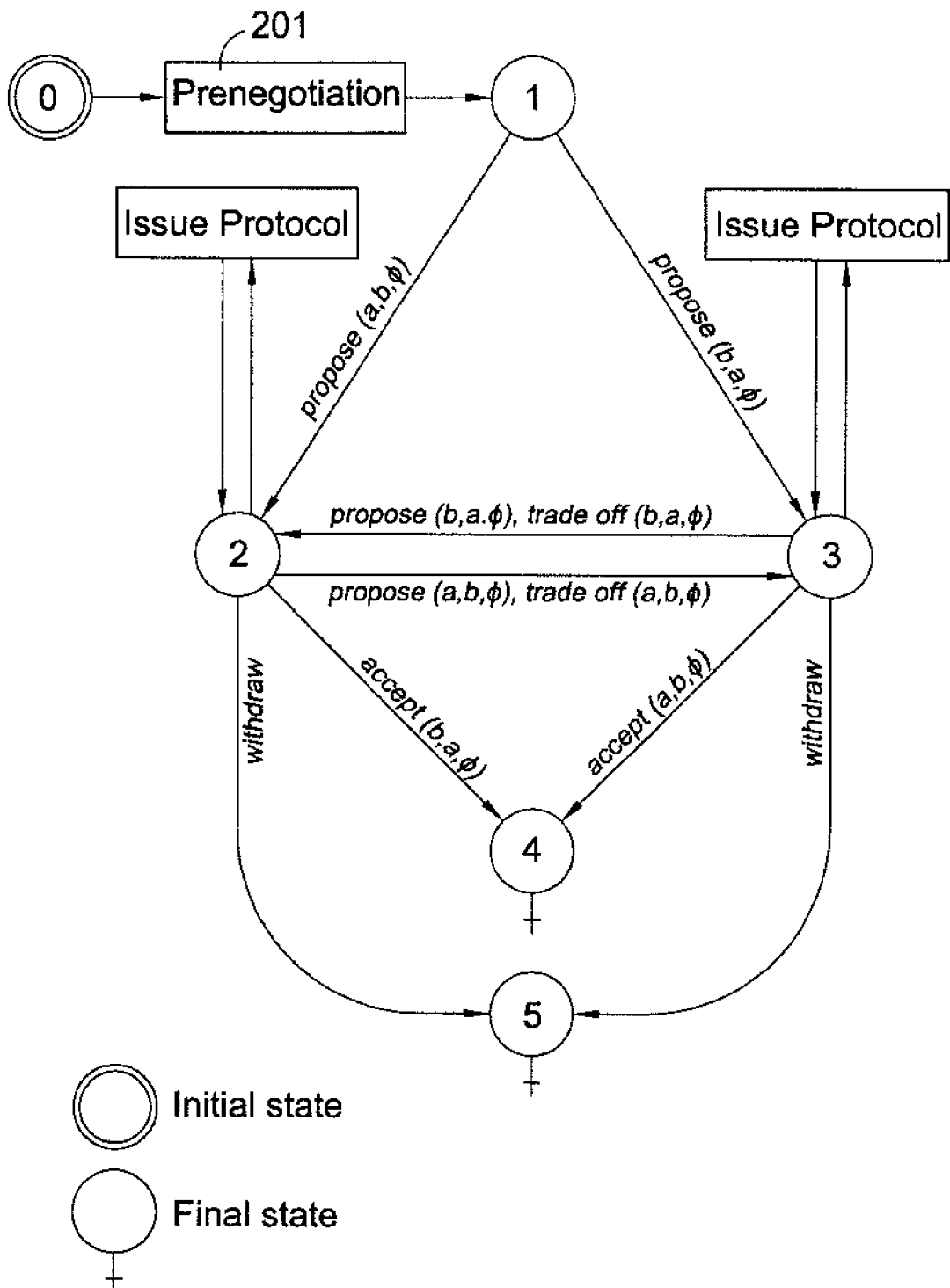

The protocol diagram of FIG. 2 starts with a dialogue 201 to establish the conditions for negotiation (deadline, initial issues, etc.) Then, one of the agents makes an offer (transition from state 1 to state 2 or state 3) for contract ø. After that, the other agent can make a counter-offer as described below or a trade off (moving to state 2 or 3 depending on who started), and the agent that started the negotiation can in turn make a new counter-offer or a new trade off (going back to state 2 or 3). Since information models used by the agents are not publicly known (that is, agents do not know the reservation values of the other party over the negotiation issues), offers maybe outside the mutual zone of agreements. Therefore, agents may iterate between states 2 and 3 taking turns to offer new contracts. In either of these two states, one of the agents may accept the last offer made by the opponent thereby moving to state 4 or any of the agents may withdraw from the negotiation (moving to state 5). Agents withdraw from the negotiation process when the deadline of negotiation has been reached without reaching an agreement.

While at state 2 or 3 agents are permitted to start an elucidatory dialogue to establish a new set of issues to negotiate over. This protocol is a natural extension of the contract net protocol permitting iterated offer and counter-offer generation and permitting the modification of the set of issues under negotiation. Although neither termination nor convergence can be assured in the general case, in practice the existence of time deadlines ensures that the protocol will terminate.

Rational behaviour is assumed to consist of maximisation of a given value function (Raiffa 1982). Given this rationality stance, the decisions faced by agents in negotiation are often a combination of offer generation decisions (which initial offer should be generated, which counter offer should be given in situations where the opponent's offer is unacceptable), and evaluatory decisions (when negotiation should be abandoned, and when an agreement is reached). The solution to these decision problems is captured in the agent architecture. The components are mechanisms of the agent architecture which are responsible for generation of offers and counter offers are based on a distinction between mechanisms which are computationally cheap and are responsive to the environment, and mechanisms which are relatively more costly because they engage in a more sophisticated search of the solution space.

The mechanisms which assist an agent with evaluation of offers is described next, followed by the generation mechanisms.

Evaluation of a contract consists of computing the value or score of the contract. When an agent, a, receives an offer x from agent b at time t, denoted by $x^t_{b \to a}$, over a set of issues J, ($x=(x[j1], \ldots, x[jn])$ where $ji \in J$), it rates the overall contract value, V, using the following weighted linear additive scoring function:

$$V^a(x) = \sum_{1 \leq i \leq n} w^a_{ji} V^a_{ji}(x[ji])$$

Where $w^a_{ji}$ is the importance (or weight) of issue ji such that $$\sum_{1 \leq i \leq n} W^a_{ji} = 1$$

Given that the changing of the set of issues during negotiation is permitted, agents must be able to dynamically change the values of the weights. The score of value x[j] for agent a, given the domain of acceptable values $D_j$, is modelled as a scoring function $V^a_j : D_j \to [0,1]$. For convenience, scores are bounded to the interval [0,1], and the scoring functions are monotonic for quantitative issues. Given the score of the offered contract, the contract evaluation function determines whether to accept or reject the contract or generate a new contract to propose back to the other agent. Mechanisms which generate new contracts are presented below.

Known responsive mechanisms model reactive behaviours relative to a number of environmental factors. The underlying rationale and motivation of the design of these mechanisms is the need to model responsive behaviours responsive to growing environmental needs. For example, if an IPCA has committed lots of resources to its negotiation with SPAs and the time of a video service required by other RPCAs is approaching, then simple and less costly decision mechanisms which can result in concession may be preferred by IPCA.

Responsive mechanisms generate offers by linearly combining simple decay functions, called tactics. Tactics generate values for issues using only single environmental criteria. For example:

Time-dependent tactics model increasing levels of concession as the deadline for the negotiation approaches.

Resource-dependent tactics model increasing levels of concession with diminishing levels of resources, such as time.

Behaviour-dependent tactics in which concession is based on the concessions of the other negotiating party.

However, to determine the best course of action agents may need to consider and assess more than just one environmental condition. Since each tactic generates a value for an issue using only a single criterion, the concept of strategy is introduced to model the modification, over time, of tactic weights as the criteria change their relative importance in response to environmental changes.

In addition to being responsive, Agents must also be deliberative. Two deliberative mechanisms are trade offs and issue set manipulations.

A trade off is a mechanism in which one party lowers its score on some issues and simultaneously demands more on other issues. For example, for the IPCA, offering a lower Price for a later Start-Time of a service may be equivalent in value (depending on the weights of the two issues) to offering a higher Price for an earlier Start-Time of a service. Thus, a trade off is a search for a contract that is equally valuable to the previous offered contract, but which may benefit the other party.

This decision mechanism is more costly than the responsive mechanisms because it involves searching all or a subset of possible contracts with the same score as the previously offered contract (hence there is no loss in contract utility) and selection of the contract which is the closest to the opponent's last contract offer.

Search is initiated by first generating new contracts which lie on what is called the iso-value (or indifference) curves (Raiffa 1982). Because all newly generated contracts lie on the same iso-value curve then agents are indifferent between any two given contracts on this curve.

Given a scoring value $\theta$, the iso-curve set at degree $\theta$ for agent a is defined as:

$$iso_a(\theta) = \{x | V^a(x) = \theta\}$$

The selection of which contract to offer is then modelled as a "closeness function". Theory of fuzzy similarity is used in order to model "closeness". The best trade off then would be the most similar contract on the iso-curve.

Given an offer x, from agent a to agent b, and a subsequent offer y, from agent b to agent a, with $\theta = V^a(x)$, trade off for agent a with respect to y is defined as:

$$tradeoff_a(x,y) = \arg\max_{x \in iso_a(\theta)} \{Sim(x,y)\}$$

Similarity between two contracts is defined as weighted combination of the similarity of the issues. Specifically the similarity between two contracts x and y over a set of issues J is defined as:

$$\text{Sim}(x, y) = \sum_{j \in J} w_j^a \text{Sim}_j(x[i], y[i])$$

where $$\sum_{j \in J} w_j^a = 1$$

and were $\text{Sim}_j$ is the similarity function for issue j.

Following the results from Valverde 1985, a similarity function (a function which satisfies the axioms of reflexivity, symmetry, and t-norm transitivity) can always be defined as conjunction (modelled as the infimum) of appropriate fuzzy equivalence relations induced by a set of criteria functions $h_i$. A criteria function is a function which maps from a given domain into values in [0,1]. For example, a function that models the criteria of whether a price is low, low price: Price→[0,1], could be defined as:

$$\text{Low price } (x) = \begin{cases} 1 & 1 & \text{if } x < £10 \\ \frac{£20-x}{£10} & \frac{£20-x}{£10} & \text{if } £10 < x < £20 \\ 2 & 0 & \text{if } x \geq £20 \end{cases}$$

Given a domain of values $D_j$, the similarity between two values $x,y \in D_j$, is defined as:

$$\text{Sim}_j(x, y) = \bigwedge_{1 \leq i \leq m} (h_i(x) \leftrightarrow h_i(y))$$

where $\{h_1, \ldots, h_m\}$ is a set of comparison criteria with $h_i: D_j \to [0,1]$, and ↔ is an equivalence operator.

Simple examples of the equivalence operator ↔ are $h(x) \leftrightarrow h(y) = 1-|h(x)-h(y)|$ or $h(x) \leftrightarrow h(y) = \min(h(y)/h(x), h(x)/h(y))$.

Another deliberation mechanism is issue set manipulation. Negotiation processes are directed and centred around the resolution of conflicts over a set J of issues. This set may consist of just one or more issues (distributed and integrative bargaining respectively). For simplification the ontology of the set of possible negotiation issues J, is assumed to be shared knowledge amongst all the agents. It is further assumed that agents begin negotiation with a prespecified set of core issues, $J^{core} \subseteq J$, and possibly other mutually agreed non-core set members, $J^{\neg core} \subseteq J$. Alterations to $J^{core}$ are not permitted since some features, such as the price of services may be mandatory. However, elements of $J^{\neg core}$ negotiation set may be altered dynamically. Agents can add issues to or remove issues from $J^{\neg core}$ as they search for new, previously unconsidered solutions.

In the scenario above agents negotiate over core packages. The negotiation between SPA and NPA agents however consist of packages which comprise not only core issues but also include issues which can be added or removed throughout the process. For example, a SPA agent may begin QoS negotiation with a NPA agent, specifying only Bandwidth. However, NPA may subsequently decide to include into QoS negotiation a high packet loss issue if SPA has demanded a high capacity Bandwidth. Alternatively, SPA may remove the Bandwidth issue from QoS negotiation with NPA if IPCA has changed its demand from a high quality video service to a standard audio service.

If $J^t$ is the set of issues being used at time t (where $J^t = \{j_1, \ldots, j_n\}$) and $J - J^t$ is the set of issues not being used at time t, and if $x^t = (x[j_1], \ldots, x[j_n])$ is a's current offer to b at time t, then issue set manipulation may be defined through two operators, add and remove, which agents can apply to the set $J^t$. The add operator assists the agent in selecting an issue j' from $J - J^t$, and an associated value x [j'], which gives the highest score from the selecting agent's perspective.

The best issue to add to the set $J^t$ may be defined as:

$\text{Add}(J^t) = \arg_j \max_{j \in J - J^t} \{\max_{x[j] \in D_j} V^a(x^t . x[j])\}$ where . denotes concatenation.

An issue's score evaluation is also used to define the remove operator in a similar fashion to the add operator. This operator assists the agent in selecting the best issue to remove from the current negotiation set, $J^t$, with the highest score.

The best issue to remove from the set $J^t$ (from a's perspective), may be defined as:

$\text{Remove}(J^t) = \arg_{ji} \max_{ji \in J^t - J^{core}} \{V^a(x')\}$ where $x' = (x'[j_1], \ldots, x'[ji-1], x'[ji+1], x'[jn])$ The remove operator can also be defined in terms of the similarity function defined above. It selects from two given offers x (from agent a to b) and y (from agent b to a) which issue to remove from y so as to maximise the similarity with respect to y. We define this similarity based remove operator as:

The best issue to remove from a's perspective from the set $J^t$ is defined as:

$\text{Remove}(J^t) = \arg_{ji} \max_{ji \in J^t - J^{core}} \{\text{sim}\}$ $((x[j1], \ldots, x[ji-1], x[ji+1], \ldots, x[jn])$ $(y[j1], \ldots, y[ji-1], y[ji+1], \ldots, y[jn]))\}$ It is not possible to define a similarity based add operator since the introduction of an issue does not permit an agent to make comparisons with the opponent's last offer, because there is no value offered over that issue. Agents deliberate over how to combine these add and remove operators in a manner which maximises some measure—such as the contract score. However, a search of the tree of possible operators so as to find the optimum set of issues may be computationally expensive and require approximate and anytime algorithms. Another computational requirement of these mechanisms is the need for an agent to dynamically recompute the issue weights.

The protocol for establishing a new set of negotiating issues is isomorphic to the negotiation protocol described in FIG. 2. The pre-negotiation phase is omitted (since the current set of issues have already been agreed). Ø is replaced by a new set of issues S, and primitives "propose" and "trade off" are replaced by primitive "new set"—a request for a new set of issues to be included into the negotiation. Each negotiating agent can start a dialogue over a new set of issues S (state 1 to state 2 or 3). Each agent can then either propose a new set (transition from state 2 to 3, depending on who started the dialogue), accept the other's proposed (state 4) set or withdraw (state 5).

Negotiation Protocol

Figure 3:
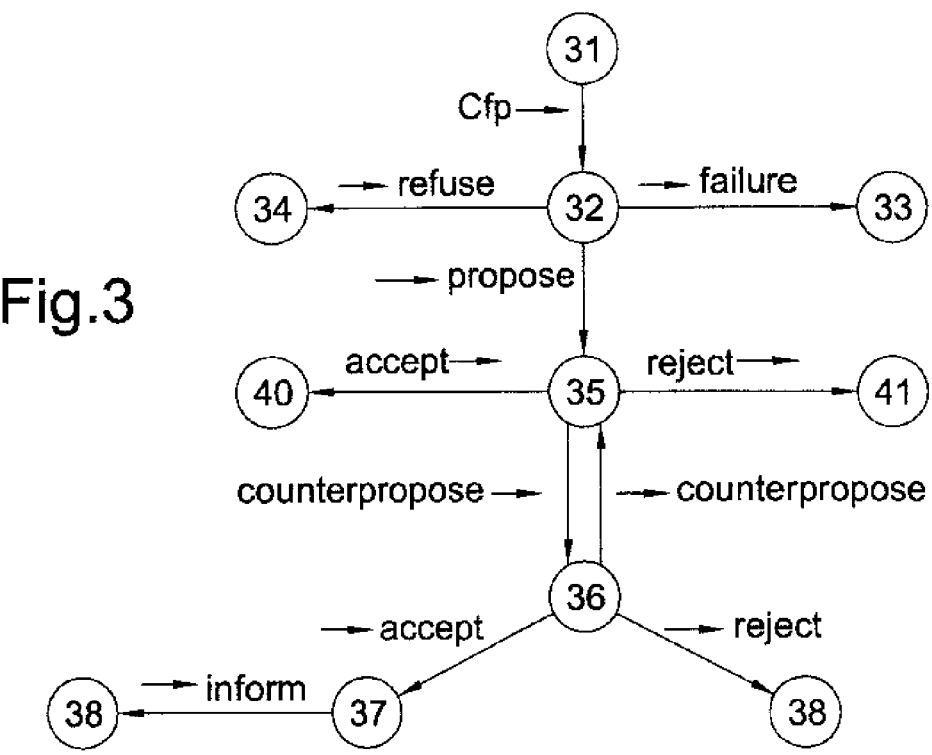
Figure 4:
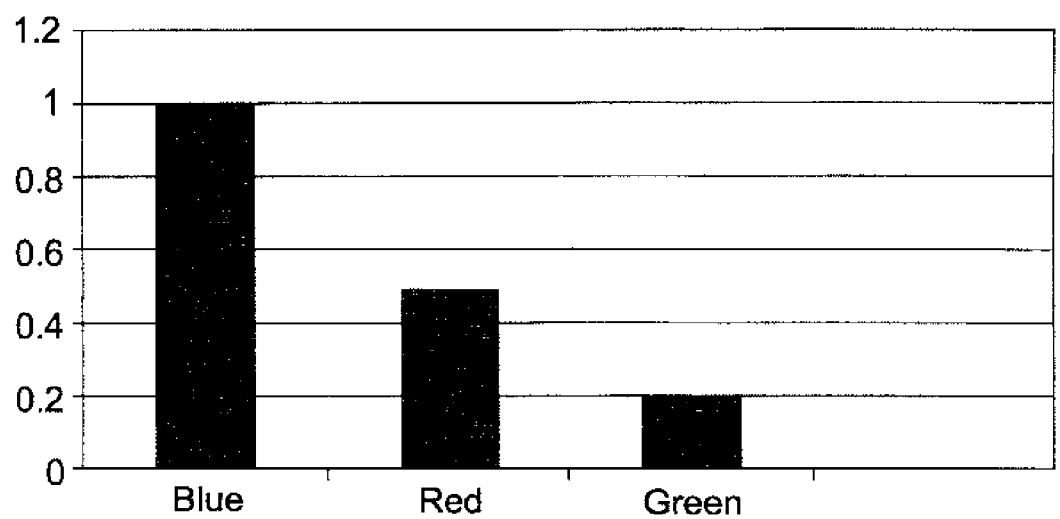

The state transition arcs of FIG. 3 represent the participants utterances: →<primitive> are those of the servers and <primitive>→ are those of the clients.

Negotiation is initiated when a client utters Call for Proposals cfp (state 31 to state 32). The server can then either indicate that it is capable (state 32 to 35) or that it is not (state 32 to failure). If the server has acknowledged its capability or if the client knows it is capable because of information contained in its acquaintance model, the client may send out a proposal (state 33 to 34). The server can then either reject the proposal (state 34 to failure), accept the proposal (state 34 to 35) or counter-propose (state 34 to 36). If the server accepts, the client may either deny the contract to the server (state 35 to failure) or else confirm the contract (state 35 to success). Otherwise, if the server has counter-proposed (state 34 to 36) then the client may either accept the new contract (state 36 to 37), reject it (state 36 to failure) or else counter-propose a new contract (state 36 to 34). There may be several transitions between states 34 and 36. If it is the client who eventually accepts the contract (state 36 to 37), then the server may decide to either award the contract to the client (state 37 to success) or else deny it to that client (state 37 to failure).

The support of negotiation also requires a sound semantic specification of the communicative acts. The negotiation primitives described here consist of an initiator, propose, a reactor, counter-propose, two completers, accept and reject. In addition to these, two messages cfp, acknowledge and cannot are provided for the agents to set up a negotiation link.

cfp: The cfp interface enables agents to ask other agents whether they are able to provide a specified service, and whether they are prepared to negotiate for the provision of that service. Informally, the semantics of this message type is the question can you do this service?
(cfp <agent_id> <service_type> <conversation_id> <message_id>)

propose: The propose interface enables an agent to initiate negotiation by sending a proposal for the provision of a service, or receive a proposal from some other agent. The proposal consists of a set of attributes that specify the contents of an SLA. Although the type of a proposal is a list of SLA_attribute, a proposal must consist of a complete SLA. This provides each agent with a context for the subsequent exchange of counter-proposals.
(propose <agent_id> <service_name> <conversation_id> <message_id> <SLA_object_id>)

<agent_id> is the unique identifier of the agent that is to receive the proposal or the agent from which the proposal was received.

<service_name> is the name of the service that is referred to in the proposal.

<conversation_id> is a unique identifier generated by the proposing agent that distinguishes the conversation initiated by this proposal from any other negotiation strands being pursued.

<message_id> is the identifier of the particular message within this conversation. Using this and the conversation identifier, an agent can keep tract of the progress being made during a particular negotiation.

<SLA_object_id> is the INSTANCE-NAME of an instance of the object class Adept_Sla.

counter-propose: The counter-propose interface enables agents to exchange modifications to the initial proposal. The modifications suggested by an agent will be at least one SLA_attribute. For example, an agent may counter-propose a lower price, or a higher price as well as a higher volume. Note that in terms of types the final field of a counter-propose message is identical to that of a propose message. However, a proposal will necessarily contain a whole SLA, and a counter-proposal may contain any non-empty part of an SLA.

<SLA_attribute> is the slot name of an attribute of an SLA. This is used to inform the CM of the slots that have been changed, and hence are being counter-proposed.
(counter-propose <agent_id> <service_name> <conversation_id> <message_id> <SLA_object_id> <SLA_attribute>+)

accept: The accept interface enables agents to send and receive messages accepting an SLA, and hence completing a negotiation with an agreement.
(accept <agent_id> <service_name> <conversation_id> <message_id>)

reject: The reject interface enables agents to send and receive messages rejecting an SLA, and hence completing a negotiation without agreement.
(reject <agent_id> <service_name> <conversation_id> <message_id>)

refuse: The refuse interface.
(refuse <agent_id> <service_name> <conversation_id> <message_id>)

failure The failure interface.
(failure <agent_id> <service_name> <conversation_id> <message_id>)

inform The inform interface.
(inform <agent_id> <service_name> <conversation_id> <message_id>)

Agent Architecture

There follows a description of the design of the agent's internal negotiation deliberation mechanisms. Each agent in the scenario is assumed to be architecturally equivalent. Sections below are the detailed description of the components of this architecture.

The Negotiation Reasoning Model

The reasoning model determines the agents behaviour in a given negotiation context. It is responsible for
  initiating negotiation to obtain a desired service
  responding to proposals from other agents
  determining when proposals should be accepted or rejected
  and determining when counter-offers should be made and what these counter offers should be.
Negotiation has three reasoning components (see [1] for a formal specification) which are supported by information maintained in the agent models and the agent's working memory.

The evaluation reasoner takes proposals or counter-proposals coming in from other agents and determines whether they should be accepted, rejected or whether a counter-proposal should be generated. If a counter-proposal is appropriate, control is handed to the strategic and tactical reasoners to produce a response.

The strategic reasoner decides, at a coarse level of granularity, how the agent should approach the particular negotiation. For example, whether it should be co-operative or competitive, whether time or resources is the primary consideration, etc.

Finally, the tactical reasoner fills in the slots of the SLA in a way that enacts the chosen strategy.

The reasoning components have two main repositories for information: the working memory (WM) and the agent models. The former represents transitory information related to ongoing negotiations, while the latter represents persistent storage of more stable information.

Information stored in the working memory is structured around the notion of a negotiation thread. A thread is essentially a record or history of utterances related to a particular negotiation need (i.e. finding a server for a particular service). It includes all the messages the agent has sent, all the messages the other agents have sent, which strategies and tactics the agent has deployed, the current status of all negotiation threads (in cases where the agent is managing multiple threads of negotiation for the same service), and the services earliest start and latest end times. Management of and traceability of concurrent threads is an important factor in many party negotiation. In order to achieve this an agent maintains a unique thread identifier with other agents using the following information:

(WM:: agent_id: Type Symbol
conversation_id: Type Symbol
message_id: Type Symbol
SLA_object id: Type Symbol)

where the slots represent:
<agent-id> is a unique identifier of the agent engaged in negotiation
<conversation_id> is the unique conversation identifier
<message_id> is an identifier for marking number of message exchange
<SLA_object_id> is an INSTANCE-NAME that points to a SLA object.

Figure 5:
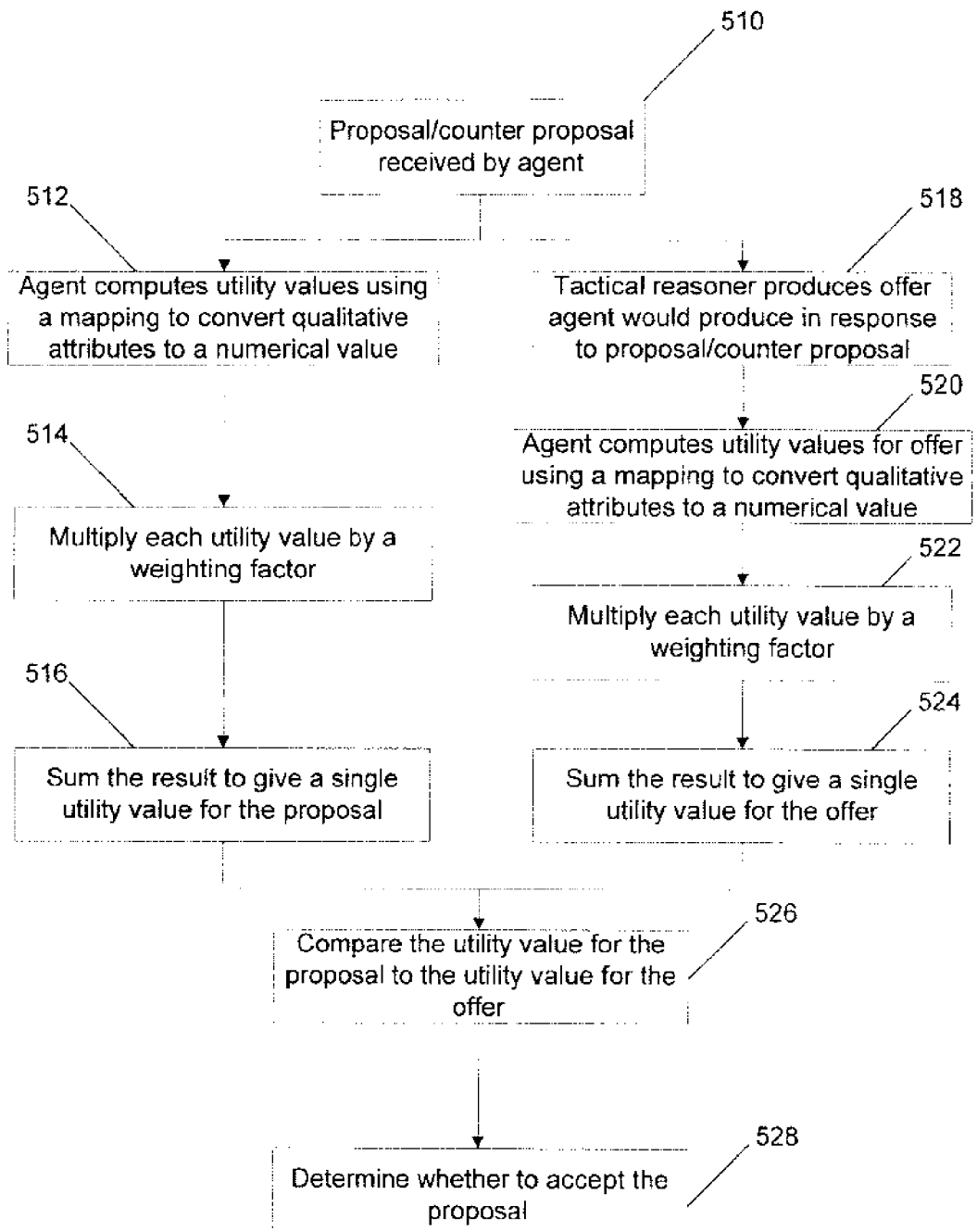
FIG. 5 is a flow diagram of the steps carried out by an agent when evaluating a proposal.

In the context of supporting negotiation, the agent models represent the agent's (private) beliefs about itself and its environment. The acquaintance model (or AM) is the storage site of the information an agent knows about other agents and is represented as the structure:

(AM:: agents: Type Symbol
topology: Type Symbol
status: Type Symbol
capacity: Type Symbol
protocol: Type Symbol)

where the slots represent:
agency agents: unique names of individual members of the agent's agency;
agency typology: the agent's relationships (peer, subsidiary agent, etc.) with other community members;
agency status: which agents are in the same organisation and which are external;
agency capacity: which agents can provide services the agent needs
the negotiation protocol; the rules of interaction The self model (or SM) is the storage site of the information an agent knows about itself and can be represented as:

(SM:: service: Type Symbol
issues: Type Symbol
reservation-values: Type Integer
weights: Type Integer
preferences_orderings/utility( ): Type Symbol
resources: Type Integer
Clock: Type Integer
commitments: Type Symbol
tactics: Type symbol)

where the slots represent:
service descriptions for the services the agent can perform itself together with an indication of the number of concurrent invocations which are permissible;
the set of issues in the negotiation set. Note, that for issue extension we will assume that all agents have a representation (or common ontology) for all possible set of issues as well as the associated reservation values, weights and utility functions.
the agent's reservation values for each issue in negotiation for the services it consumes and provides;
importance of various issues under negotiation
the preference orderings (or utility function) for the ranges of the issue.
a representation of time
the commitments the agent has already made through its SLAs;
and the set of available tactics the agent can use to compute offers The evaluation reasoner becomes active when an agent receives a proposal or counter-proposal from another agent. Upon receipt of such a message, the agent computes the utility it attains for the proposal. It uses an additive scoring function over each slot in the SLA where each slot is assigned a weight representing the relative importance of that issue to that agent. For example, as illustrated in FIG. 5, when an agent receives a SLA (Step 510) it goes through each slot in the proposal and computes a measure of desirability (a utility rating between 0 and 1) to the value contained therein (Step 512). The raw utility values are then multiplied by a weighting factor, which indicates their relative importance, (Step 514) and then summed over all the slots (Step 516). This process produces a single utility value for the proposed SLA. In parallel, the agent sends the offer just received to the tactical reasoner (Step 518) to see what offer the agent would produce next using its current strategies and tactics. Once computed, this offer is returned to the evaluation reasoner and rated using the aforementioned scoring function (Steps 520 to 524). The computed utility values of the proposal and offer are compared (Step 526) and, if the utility of the offer the agent would have sent is less than the utility of the offer just received, the offer is accepted (Step 528). Acceptance involves a conditional commitment by the server that it will execute the specified service under the SLA's terms and conditions. The commitment is conditional in that the client still has to confirm or deny the contract. Assuming the client confirms the contract, it then terminates all other negotiation threads for the same service instance. The second outcome of the SLAs evaluation is that the proposal is rejected. This occurs when: (i) the deadline for reaching an agreement has been reached; or (ii) another agent has been selected to perform the service. The final evaluation outcome is that the offer is neither accepted nor rejected. In this case, the agent generates a counter offer.

If a counter offer is to be made, the evaluation reasoner also makes an assessment of the opponent's negotiation behaviour in the current thread with respect to time. Thus evaluation is not only confined to the current offer instance, it also incorporates the relationship of that offer to previous ones in the thread. In particular, the agent classifies the behaviour of its opponent into one of three mutually exclusive states: i) CONCEDING: the utility to the recipient of the last offer is greater than the previous offer received from that agent; ii) EXPLOITING: the utility to the recipient of the last offer is less than the previous offer received from that agent; or iii) STALEMATE: the utility to the recipient of the last offer is the same as the previous offer received from that agent. As well as the direction of change, the agent uses the negotiation thread history to determine the rate of change of that state. Thus the agent calculates whether this conceding/exploiting is INTENSIFYING, LESSENING, or CONSTANT. These two pieces of information are then passed onto the strategic reasoner which uses them to determine whether its present strategy is being successful or whether a change is needed. The pseudo-code for the evaluation reasoner is given below.

evaluate(Propose OR Counter-propose, SLA_in){issues (Weights),
  /* Retrieve preferences over the issues */ thread (Thread),
    /* Retrieve the Thread */ utility(SLA_in,Weights,Value_in),
  /* compute the utility of the offered SLA */ compute_new_offer(Strategy,Tactic,SLA_out),
  /* compute what offer would have been generated */ utility(SLA_out,Weights,Value_out),
  /* compute the utility of that offer*/ if Value_out <Value_in then accept,
  else time_left=0, then reject,
    else have_SLA then reject,
    else counter_Propose(SLA_out),
      negotiation_state(Thread).
        /* compute the state of negotiation */}

The strategic reasoner is invoked by the evaluation reasoner in the case of an ongoing negotiation or by request for new negotiations. In either case, the purpose of the reasoning at this level is to set broad guidelines about how the agent should behave in a particular negotiation context. These guidelines relate to determining the relative importance of the three classes of behaviour which take time, resources, and an opponent's behaviour as the primary basis for computing an offer. Time is important when the negotiation has a deadline. Resources need to be considered so that the agent expends an amount appropriate to the value of the contract. The opponent's behaviour is considered to ensure the agent is not exploited during the negotiation. The relative importance of the three classes is expressed by assigning a series of weights to the alternatives.

For new negotiations, the agent receives information about when the service is required (HAVE-TIME, NOW), uses AM information about the number of known suppliers of the service (ONE, MANY), and uses AM information about the agent's relationship with the potential service provider (SAME-ORGANISATION, EXTERNAL-ORGANISATION) to set the strategy.

The first strategic decision relates to the logistics of the negotiation: who to negotiate with, whether to negotiate with more than one agent, and if more than one agent is to be negotiated with then should the negotiation proceed sequentially or in parallel. If there is only one service provider then the agent has no real choice to make at this level.

Having decided upon the logistics, the agent must determine how it is to behave. In addition to setting the strategy, the agent records its expectation of how the negotiation will develop in terms of the speed at which it will converge and the likely response of the opponent. This information is then used to monitor the progress of the ongoing negotiation.

For ongoing negotiations, the role of the strategic reasoner is to determine whether the current strategy is being successful (in terms of the agent's predictions about its development and in terms of the utility the agent is obtaining from the deal) in fulfilling the agent's negotiation objectives. Such monitoring is needed because the world in which the agent is operating is subject to change (e.g. the agent may require the service sooner/later than it estimated or a new provider for the service may be discovered) and also because operating a fixed, unchanging strategy means the agent is more open to exploitation by its opponents (since its behaviour is easier to predict). Strategy modification is triggered by two types of event: (i) whether there is a change in the agent's internal state (e.g. whether the time by which an agreement should be in place is becoming critical); and (ii) how the opponent is behaving (e.g. CONCEDING, EXPLOITING, STALEMATE, INTENSIFYING, LESSENING, CONSTANT). The pseudo-code for the strategic reasoner is given below.

begin(strategy){
  if(Negotiation=new) then{
  compute(behaviour_importance),
    /* assign weights to different tactic classes */ if(agents>1) then
  compute(logistics),
  /* compute who to negotiate with and wheh*/
    compute (expectations)
    /* compute likely response of strategy */}
  else assess(goals)
    /*assess distance to objective */
end(strategy)}.

The role of the tactical reasoner is to enact the high-level behaviour set by the strategic reasoner. The output of this level is a SLA which has values in each of its slots. Thus a tactic is a function which acts in line with the set strategy, to set a value for each SLA slot. For quantitative slot parameters, tactics have to select a value in between the allowable minimum and maximum value for that issue. For qualitative values, the tactics have to choose from a discrete range of alternatives; a process achieved by mapping the qualitative values onto the quantitative scoring function.

The way in which tactics differ is in how they go about computing a slot value. There are three main ways of coming to a value.

Time-dependent tactics: This family of tactics base their behaviour on the time remaining until an agreement must be in place. At their negotiation deadline all these tactics put forward their reservation values. However the way in which they concede to reach these values differs. There are two broad patterns of concession: (i) boulware: maintain the offer until the time is almost exhausted and then begin to concede up to the reservation value; and (ii) conceder move rapidly to the reservation value.

Resource-dependent tactics: This family of tactics base their behaviour on the amount of a given resource remaining. The property of these tactics is that they model the urgency of the deal as: i) the resources become scarcer, ii) the willingness of other parties in negotiation decreases (measured as an increase in the length of the negotiation thread) and iii) the computational load on the agent increases. The actual relationship is that the quantity of time left in negotiation is directly proportional to the number of agents in the negotiation and inversely proportional to the length of the negotiation thread. Thus, the more agents who are potentially available to perform the service, the longer the agent can afford to negotiate. But the longer the duration of the negotiation, the more urgent the need for an agreement becomes.

Behaviour-dependent tactics: This family of tactics base their behaviour on how their opponent behaves during the ongoing negotiation thread. The tactics within this family differ in which aspect of their opponent's behaviour they imitate, and to what degree. There are three ways in which behaviour can be imitated: i) Relative Tit-For-Tat; ii) Absolute Tit-for-Tat; and iii) Averaged Tit-For-Tat, where other's behaviour is, respectively, imitated proportionally, absolutely and in an averaged fashion.

Each of the families computes a value for each of the negotiation issues based upon their particular perspective. The three values for each issue are then combined, according to the relative weightings set by the strategic reasoner, to provide a single value which is the one put forward for that issue.

```
begin (tactic) {
    foreach (issue) {
        compute_offer (time-dependent,Of1),
        compute_offer (resource-dependent,f2),
        compute_offer (behaviour-dependent, Of3),
        /* compute offer for each issue using all tactics
*/
    +( (Of1*time-dependent_weight),
        (Of2*resource-dependent_weight),
           (Of3*behaviour-dependent, Weight),
        /*combine the offers according to their weights */
        instantiate (SLA),}
end (tactic)}.
```

Treatment of Qualitative Issues

The developed model described above does not support negotiation over qualitative issues since it is based on quantitative computation. Tactics functions have a range of values (the reservations) and a single environmental variable as their domain and a discrete value (an offer for an issue) as their range. Moreover, the rate of change of these offers are continuous.

The proposed solution is to represent reservation values differently by mapping each attribute of a qualitative issue into a value system and then computing offers not using the reservation values of the issue (i.e. the actual ranges of the $min_j$ and $max_j$) for qualitative issue j but with the values of the issues. For example, consider the case where an issue has three attributes: blue, red and green. The first step in negotiation over qualitative issues is to map these attributes into values by assigning to each attribute a value. Note, that we must have ordered preferences.

More formally, let $D_j=\{q_1, q_2 \ldots q_n\}$ be the set of qualitative attributes, where $q_x$ is attribute x of the qualitative issue (e.g. blue). Then, $min_j = min\{V_j(D_j)\}$, and $max_j = max(V_j(D_j))$. The next step is to redefine elements of tactics. Assume that it is the turn of agent a to utter a new offer. Given this new representation of reservation values the time-dependent and resource-dependent tactics become:

$$X_{a \to b}[j] = \text{inverse}(min_j + (1-\alpha(t))(max_j - min_j)) \text{ if } V_j \text{ is increasing}$$

where $\alpha(t)$ is computed as before (for time-dependents based on the difference between t and $t_{max}$ and for resource-dependents as the amount of resources) and inverse( ) is the function that remaps the value (say 0.6) to a discrete qualitative attribute (say red). The form of inverse( ) function is given below.

Likewise the imitative tactics become:

$$X_a \to b[j] = \begin{cases} min_j & \text{if } P \leq min \\ max_j & \text{if } P \geq max_j \\ \text{Inverse } (P) & \text{otherwise} \end{cases}$$

where $$P = v_j(x_{b \to a}, t_{n-28}[j])/v_j(x_{b \to a}, t_{n-28+2}[j]) * v_j(x_{a \to b}, t_{n-1}[j])$$

The inverse( ) function is the nearest neighbour algorithm which remaps quantitative values of utility/value of a deal back into the nearest attribute of the qualitative issue. The pseudo-code for the nearest neighbour is:

```
0 compute_distance(V(x_j),V(D_j)),
                                        /*compute distances to values of
                                        attributes in the domain of attri-
                                        butes given the value of the
                                        offer */
1 if(equidistance) then randomly select
2 else select (closest)                 /*select the closest v(d_j) to
                                        v(x_j) /*
3 remap(V(x_j) ,attribute)              /*map attribute value back to attribute
                                        label */
```

Because the final offer is the product of what the tactics suggest for the issue and what the weights associated with that issue (i.e multiplication of a qualitative and quantitative values respectively) we will model the inverses function at the strategic level. Therefore, the tactics suggest a numeric output for the value of an issue and only when this value is multiplied by the appropriate weight will the inverse( ) function produce the remapping into attribute label.

Treatment of Issue Extension

The introduction of new issues has been identified as an advanced SLA negotiation scenario, where agents can dynamically introduce new issues into the negotiation set through the negotiation thread. One reason for this introduction is that agents may decide to increase the likelihood of convergence of a negotiation thread. Agents are therefore required to:

recognise negotiation states which can lead to possible convergence problems and reason about possible solutions The proposed solution for the recognition problem is to dynamically track the rate of change of the utility of the offered SLAs. The rate of change of utility can be determined by determining two parameters (which is given by the user): i) the length of the thread which will be used for determining the state of the negotiation thread (call this L) and ii) a threshold which can be used to classify the thread states (call this Θ). The agent in effect compares the utility of the last offered contract with that of the contract L steps back in the history of the negotiation (or thread) and ascertains whether the differences between the overall utility of these two contracts are within a given threshold. If they are then a divergence from the required dynamics is detected and a new issue is added to the current negotiation set. Otherwise negotiation continues as usual.

The combined deliberation mechanism is given by the pseudo-code:

Evaluate_state (Thread,L,Θ,State) {/*evaluate the state of the thread given L and Θ*/

Utility(last_offer,X), /* compute utility( ) of last offer */ utility(Thread,L,Y)},/*compute utility of previous offer L steps back */

If (abs(X−Y)>Θ) then Introduce(Issue)/* introduce issue of choice if Θ is reached */

Else continue

The choice of which issue to introduce is domain dependent and agents are assumed to know which issues can be included. For simplicity the current implementation will select the first issue that is on top of the stack, although future implementations can be more intelligent by selecting the issue which has the lowest weight first.

Introduction of a new issue has direct influence on the management of threads and the agent's knowledge-bases. In particular, behaviour-dependent tactics which compute an offer for an issue based on history of offers have to compute the values for a new issue which does not exists in the thread history. Therefore, we will assume that these tactics continue to concede until there exists enough utterances over the new issue (in the window given by 6) to compute their values.

Introduction of a new issue also influences the beliefs of not only the agent that introduces an issue but also the agent who is offered a new issue. Both agents must update their self models over: i) the set if issues, ii) data relevant to the new issue (such as the reservation values, K and utility function information), iii) the new set of weights given the new issue (given the constraint that all weights must normalise to 1) and iv) the values of τ over the new issue (or the strategy the agent adopts over the new issue).

Furthermore, we will assume that all agents have a representation of all the possible set of negotiation issues involved in the domain of discourse (a common ontology). However, in cases where this is not the case (i.e. the new offered issue is not a member of the representational set of issues in the receiver's set) then the receiver agent must have the capability of: i) delete the last utterances from the thread and ii) responding with a message that informs the sender agent of the ontological problems. The proposing agent can then select the next issue from the new issues which is on top of the stack. If no other new issues are available then the agent continues negotiation with the existing set of issues.

Finally, since the rationale for introduction of a new issue is to "kick start"/ escape local minima in negotiation, then the agents must have conciliatory attitudes towards the newly added issues. Therefore, κ must be high, τ set to high values over conciliatory tactics and low weights over the new issue (to reflect their lower significance than "core" negotiation issues).

Further by way of background, conventional arrangements for use in e-commerce are disclosed in the aforementioned U.S. Pat. No. 5,794,207, such as the implementation of contract law electronically; encryption procedures; online registration; payment preferences and payment through credit card transactions and the like; anonymity and trusted server implementations; and delayed payment options. Associated hardware is disclosed in that patent specification. Further information may also be obtained from our GB-A-2332288 entitled "Agent Enabling Technology" and published on 16 Jun. 1999: this specification discloses the infrastructure for supporting agent-oriented programming particularly over a set of distributed physical resources. By way of example, it discloses the use of CORBA (Common Object Request Broker Architecture Platform), a standard for distributed objects being developed by the Object Management Group (OMG). It also explains the means for interfacing the computing entities to the communications means such as the CORBA platform, using an agent communication language such as FIPA (Foundation for Intelligent Physical Agents) ACL (Agent Communication Language). Alternatively the agent communication language may comprise KQML (Knowledge Query and Manipulation Language). Details of these systems will not be disclosed herein, for reasons of brevity.

The use of object oriented processing is also disclosed in the context of an automated communications system in U.S. Pat. No. 5,862,325 entitled "Computer based Communication System and Method using Metadata Defining a Control Structure"assigned to Intermind Corporation.

An embodiment of the present invention will now be described with reference to FIGS. 6 to 10, but with reference to the agent enabling technology of our GB-A-2332288, and to the description above of flexible agent based negotiators.

In the implementation of the invention, the following technical features are involved:

FIPA-OS features (implementation of Agent Enabling Technology patent):
  Originated from FIPA guidelines.
  Standard interaction protocols and message types (performatives, based on speech act theory) encoded in XML or any other syntax as required.
  Message content (i.e. bids and counter bids) encoded in XML/RDF or any other syntax as required.
  Protocol examples:
    Contract-Net
    Iterated-Contract-Net
    English-Auction
    Dutch-Auction
  Federated yellow pages service.
Negotiation Engine features as disclosed in our Application No. 9907477.5:
  Multiple qualitative and quantitative issues.
  Trade-off mechanism.
  Negotiation Engine features:
Freely customisable with the use of XML encoded Negotiation, Profiles.
  Customisation of negotiation strategies, tactics, issues and relative weights, supported via direct editing of XML encoded negotiation profiles using text editors.
Performance graphing:
  Dynamic, as the proposals are sent and received the line graph is updated.
  Post-negotiation, the line graph is produced to track the entire negotiation.
  A single graph is produced per issue and the utility for each agent involved in the negotiation is plotted on the graph.
Database Interface binding to OO databases (e.g. ObjectStore PSE Pro small footprint OO database and Oracle, etc.).

Web based UI (HTML).

Wireless UI (WML/WAP).

Database Interface binding for LDAP and SmartCards (e.g. Gemplus Java SmartCard).

Constrained iterated contract net negotiation protocol for quick/trusted negotiation.

Ability to define new protocols in RDF and dynamically adapt to follow the new protocol rules.

Ability to define arbitrary facts and rules in RDF and reason over the rules within an agent (e.g. Jess enabled agent).

Recommendation system.

Integration with a back-office stock control system.

Ability to quickly wrap web-based services using a Web wrapping tool-kit.

The necessary infrastructure will now be discussed in broad terms.

In the creation of highly scalable, Internet-enabled or intelligent distributed systems, often the infrastructure complexity can be overwhelming. The costly 'build from scratch' techniques that dominate most software production are giving way to techniques that emphasise construction from reusable building blocks. There are however limitations and trade-offs in using various abstractions in software component architectures. Getting it wrong can simply result in transferring a high-cost in the building software phase to the software maintenance phase because of the need to maintain an unsuitable composition abstraction. Further to this, service provision means not taking the network down when introducing new services or changes to the existing services that are currently on the network. Compilation and re-booting such services and the system infrastructure is time consuming, difficult to manage and may result in inconsistencies. In order to support dynamic open services, key computational requirements and characteristics need to be explicitly managed. The two key features considered here are autonomous service computations and rich communication mechanism.

Distributed service architectures are predominantly designed as components whose interfaces are defined using an API based on method or procedure calls rather than from a defining set of autonomous computation entities that interact through a rich communication layer. Recently an alternative model for distributed applications has emerged in which service components are modelled as software agents. There are many different views and types of agents. The Reverse Auction service described here is implemented using Multi-Agent Systems (MAS) where agents are defined as coarse grained computational entities, that operate with a degree of autonomy, that have some reasoning capability and can interact with each other using an Agent Communication Language (ACL) based on speech-acts [Searle, 1969];

To achieve some notion of "openness" the system must have a standard way of sharing the available services and information. How the interfaces are defined and the protocols communicated during interaction between these software entities will depend on what level of openness is supported. Depending on the level of openness, developer intervention may be required in order to allow new services to be added, extended or maintained and whether or not a set of services sharing the same architecture need to be taken off-line while changes are made.

In open distributed systems, service requesters do not necessarily have comprehensive apriori knowledge about the service providers they wish to use. This is particularly relevant in the eCommerce domain where the users are clearly nomadic. Requesters may have apriori knowledge about the types of service provider, but they may not know: the name of a particular provider; where that provider is located and how to invoke it; what the particular service consists of and what to do if problems occur during use. Meta services, such as directory, communication, federation and management services as provided by the FIPA-OS platform facilitate flexibility in modelling the domain specific services.

Object-oriented (OO) interaction requires developers to work at a low level of abstraction for a number of reasons. Firstly, the client object usually binds to a specific instance of a server object. This requires the client object to obtain detailed information of the server's interface and a handle or identifier to a specific instance of the server itself before a client object can initiate interaction. The most commonly used CORBA interfaces used for supported distributed OO interactions are statically bound to the requester at compile time. CORBA supports a dynamic invocation interface, but this is restricted when compared directly with using an ACL as the parameter order of service requests must tally with the service provider interface and detailed information, such as the length of the arguments and how to manage the memory allocated by the parameters in the service request must also be specified.

Further, the generic services provided by CORBA include communication and naming. There is a general lack of support for a holistic service view. The directory service (CORBA Trader) is supported, usually as an option and there is no standard federation service which enables a service request to be matched to a group of service providers.

The interaction pattern between requesters and providers typically follows a pull interaction. By default the requester is active, the provider is passive and the requester blocks until the provider completes the request. Multi-Agent Systems constructed using the Agent Enabling Technology framework place an emphasis on the use of a rich agent communication language to communicate high level concepts to distributed reasoning processes. The communication language in agent systems is used to some extent to co-ordinate and share information and services—it is an agent's API. It is the main way an agent externalises its requests or solutions to the rest of the agent community. Agent communication leads to openness and flexibility because a service requester's preferences and a service supplier's capabilities can be separated, published and matched dynamically using third-party facilitators. Agent communication promotes autonomy because agents issue requests to other agents to perform some action on the service requester's behalf—it is a type of indirect service invocation. The service supplier agent is able to refuse the request for a number of reasons such as lack of resources, the request was not understood, the request was understood but was not within the expertise of the agent or the agent has other priorities.

Smart middleware needs the properties of agent technology—autonomy (to make decisions without human assistance), reactivity (to perceive changes and react accordingly), pro-activity (to have goal oriented behaviour) and social ability (to interact with other agents to achieve goals). The definition of an agent, for the purposes of the Reverse Auction application is as follows. An agent is an encapsulated software entity with its own state, behaviour, thread of control, and an ability to interact and communicate with other entities—including people, other agents, and/or legacy systems. This definition puts an agent in the same family, but distinct from objects, functions and processes. The agent paradigm is different to the traditional client-server approach; agents can interact on a peer-to-peer level, competing, collaborating and co-operating to achieve their goals: agent communications and semantic interoperability are therefore key agent abilities. A common type of agent is the intelligent agent, one that exhibits 'smart' behaviour. This can range from the primitive behaviour achieved through following user-defined scripts, to the adaptive behaviour of neural networks or other heuristic techniques. Another common attribute for some agents is an ability to migrate seamlessly from one platform to another whilst retaining state information, known as a mobile agent. Usually intelligent agents are not mobile since, in general, the larger an agent is the less desirable it is to move it; coding artificial intelligence into an agent will usually make it bigger.

A Multi-agent system (MAS) is a collection of agents with specific roles within an organisational structure. It provides a high level paradigm whereby agents can assume roles within the chosen application area and also provide robustness against failure due to their distribution across heterogeneous networks. Multi-agent systems provide a combination of local reactivity and global planning. Each agent may be specialised at solving a particular aspect of the domain problem (e.g. service component location) while a complex task (e.g. selling a product to a customer that is composed of parts purchased from numerous suppliers) can be achieved through communication and co-operation amongst agents. Agents can provide accurate monitoring and quicker and more efficient local decision-making regarding the use of resources. By using agents, services and the service infrastructure can dynamically adapt to environmental aspects such as changes in the available network quality of service, and therefore improve performance and usability of services over time.

The Agent Enabling Technology platform described above has the advantage of being strictly FIPA compliant and having been proven to be inter-operable with other FIPA-compliant platforms.

Figure 9:
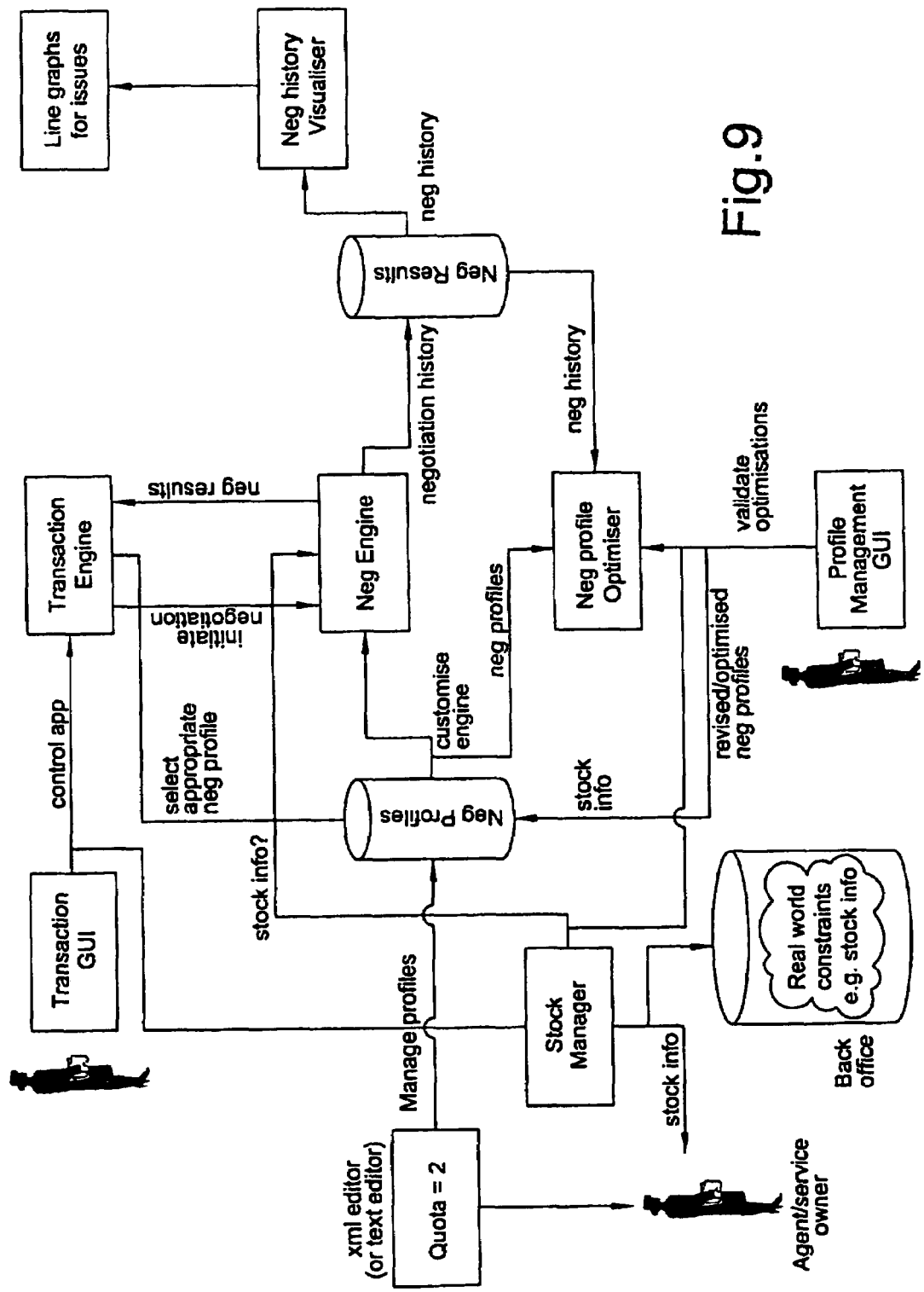
FIG. 9 is a schematic diagram showing the architecture of a software agent for flexible negotiation.
Figure 11:
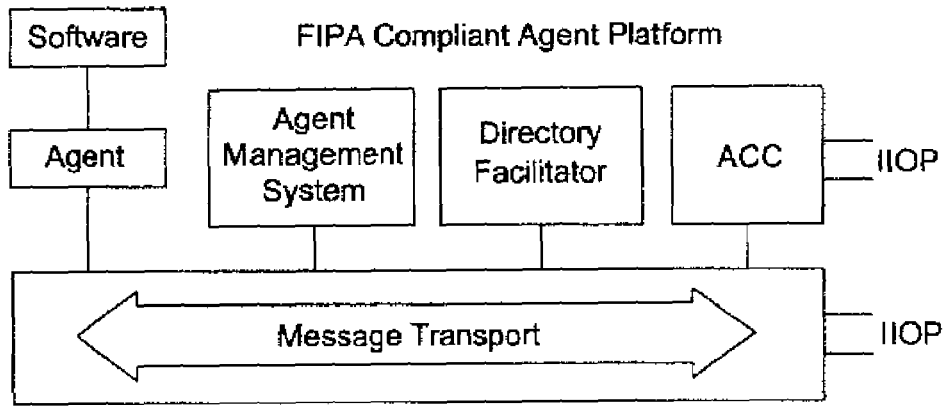
FIG. 11 is a diagram of a FIPA compliant agent platform.
Figure 12:
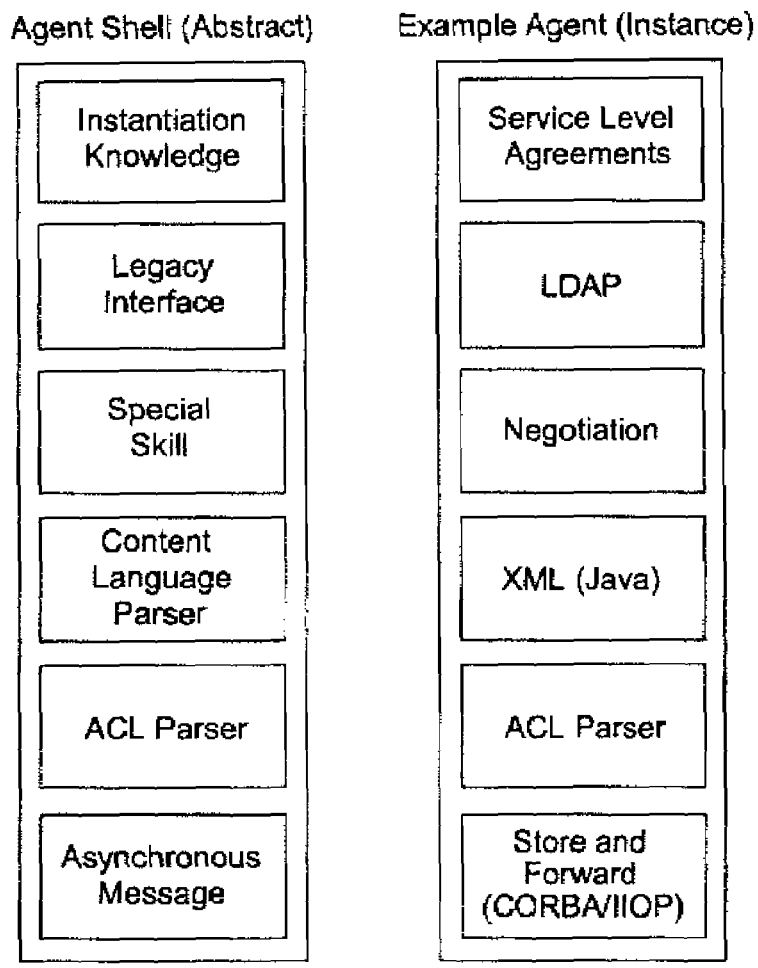
FIG. 12 is a diagram of an abstract agent shell, on the left-hand side, and an example of an agent, on the right-hand side, completed around that shell.

The functional architecture for a FIPA-compliant agent platform is illustrated in FIG. 11. The core facilities of FIPA 97 are supported, enabling semantic interoperability between agents on platforms from different manufacturers. Points of interest regarding existing FIPA-compliant platforms for constructing the Reverse Auction application include:

Legacy "software" is wrapped by an agent;
The Directory Facilitator (DF) provides "yellow pages" look up for agents;
The Agent Management System (AMS) looks after the platform management including creation/deletion of agents and agent "white pages";
The Agent Communication Channel (ACC) is used to route messages to other agents;
Pure Java implementation (although other languages are supported);
Alternative transports are possible (e.g. HTTP, WAP, etc.);
IIOP is the baseline for interoperability An agent "shell" is illustrated in FIG. 12, which allows agents to be built from a small set of components. The AMS, DF and ACC illustrated in FIG. 11 are all constructed by adding components and domain specific information to the agent "shell". The lower three components are fundamental to FIPA compliant agents, and these deal with the messaging construction/parsing. The upper three components categorise the agent, its domain, its goals, and any special abilities it might have (e.g. negotiation, mediation, brokerage, etc.). This agent "shell" will be used to compose the buyer, seller, intermediary and brokerage agents described in this patent application. The example agent in FIG. 9 shows the core components used to construct a buyer, seller or intermediary agent. The Negotiation Engine refers to the component with the ability to generate bids and counter bids.

A software agent is illustrated in FIG. 9, and its architecture will now be described, from a static high level view of the components required to implement the buyer, seller or an intermediary agent. These components complement the components which are provided by the agent infrastructure technology that supports, amongst other services, the ability to communicate with other agents via speech-act based (XML encoded) asynchronous messages.

The core functional components of the reverse auction agent architecture are the Transaction Engine and the Negotiation Engine. These components can be visualised as special skills in the agent "shell" instance shown in FIG. 12.

The Transaction Engine controls the strategy for a given negotiation. The Transaction Engine is used to initiate negotiations (either upon user request or upon request from another agent) by determining which Negotiation Profile to use based on accessing stock data via the Stock Manager and reasoning over other implementation specific goals, such as a seller agent for a given corporation may have encoded sales targets that must be reached each month. Such targets would directly impact characteristics of the negotiation depending on how well the agent had performed against reaching those targets.

The Negotiation Engine uses the characteristics defined in the Negotiation Profile to initialise itself. This directly relates to the types of algorithms selected for use for constructing bids and counter bids. The Negotiation Engine is instructed to generate a bid or counter bid by the Transaction Engine. The generated bid information is used to form an ACL message which is sent to the determined recipient agent. Details of how the appropriate recipient agents are located and the form of the interaction protocols between the agents is discuss in latter sections. When bids or counter bids are received from other agents the Transaction Engine is first used as in the case when initiating the negotiation to determine which negotiation profile should be used based on real-life stock information and any higher level agent strategies (such as corporate agreements between trading partners). As with initiating the negotiation the Negotiation Engine is then instructed to generate counter-bid information which is encoded and sent to the appropriate agents. Each bid that is sent or received is logged in the Neg Results repository. Once the negotiation reaches a conclusion (e.g. the bid is either accepted or rejected) the Negotiation Engine logs the result in the Neg Results store and returns control to the Transaction Engine component. Details of how this functionality could be implemented are given above in relation to FIGS. 1 to 4.

The core data stores included in the architecture are Negotiation Profiles, Negotiation Results and back office systems for real life stock information. Negotiation Profiles are described in a later section.

Negotiation Results includes an audit trail of the bids sent/received and counter-bids sent/received and the final result of each negotiation. These negotiation results can be used to for analysis on the performance of an agent such that its portfolio of negotiation profiles can be "tuned" for more effective negotiation in the future. The process of visualising and analysing the negotiation results is illustrated as the Neg Profile Optimiser on the architecture diagram. The results of the analysis can be used to directly update the Negotiation Profiles via an XML editor as illustrated in FIG. 9 as described in the later section Negotiation Profiles.

The Stock Manager component on the architecture diagram illustrates the link to the existing back office systems that store stock details such as stock levels and product descriptions. This information is used by the Transaction Manager to influence such decisions as to which Negotiation Profile should be used to configure the negotiation engine. The decisions made by the Transaction Manager depend on its implementation, for example a supplier may have certain sales goals, such as no stock must be held for more than 4 weeks. Such a goal set for the suppliers agent would then lead it to adopt different Negotiation Profiles (strategies) over time to help ensure that the required sales are met, e.g. early in the month whilst the stock is fresh the supplier may demand deals that benefit itself greater than the consumer however, when the end of the month is approaching, the supplier may utilise Negotiation Profiles (strategies) that reduce the gains of the supplier, potentially leading to it making losses on some sales as the increased gains it made earlier in the month ensure that overall the supplier is in profit and the sales targets have also been met.

The type of integration required to implement the Stock Manager depends on the legacy back office system in use for a given supplier that could range from popular SAP R3 systems to a first generation eCommerce solution. For the later technology such as the Fast Web Wrapping service as described in a separate patent application could be utilised to exploit the fact that a web interface has already been produced that wraps their legacy back office system.

The Transaction GUI forms the interface point between the agent whether it represents the buyer, seller or intermediary and provides service specific GUI to enable the user to specify what type of product they wish to buy or sell. This GUI forms the trigger the service Use Case scenarios. The GUI will enable the human user to encode the task it wishes to delegate to its agent. For example, such tasks could be to buy a Japanese sports car for under 10K pounds (described below with reference to FIG. 10) or buy a Shania Twain CD for the least amount possible although it must be delivered within 2 days.

The Negotiation Profile contains an encoding of the negotiation characteristics and requirements and the level of authority in which the agent has to operate within a given Reverse Auction as the delegate of a human operator. The level of authority could range from a fully trusted (automated) agent that has the ability to actually make the final transaction to purchase the product as agreed as the result of the negotiation to an agent that must wait for user confirmation (via the service GUI or alternative human interaction means such as email) before it can complete the transaction to purchase the agreed product.

The data encoded in a Negotiation Protocol includes the set of issues to be negotiated over (such as price, delivery time, colour, etc.) and the time before a solution must be reached. The number and type of issues used in bids and counter bids can be altered dynamically by application of the technology described above for Flexible Negotiating Agents (FIGS. 1 to 4).

For each issue the following details are specified:
  minimum and maximum acceptable values;
  multiplier to determine the step from the reserve value for generating the first bid;
  direction of negotiation (bids get lower or higher);
  type of tactic to be used;
  type of strategy to be used;

The Negotiation Profile is used to dynamically configure the negotiation engine which forms a component of the Reverse Auction agent. The details contained in a given profile determine the character of the agent and hence how the given agent will act in a given negotiation/auction. A single buyer/seller/intermediary agent may have numerous negotiation profiles associated with it. Context information of a given auction influences which negotiation profile is adopted at a given time. For example, a negotiation profile that describes a hard negotiator may be selected when a high profit margin is required.

Negotiation profiles are encoded in XML as a implementation independent means, as can be seen in an example profile taken from the sample eDeals on heels Reverse Auction service. The use of XML ensures that the profiles can be visualised and edited in a variety of tools ranging from dedicated XML enabled editing tools to simple web browsers. The prime advantage of encoded details of the negotiation issues and requirements in a profile is that it enables the buyer/seller/intermediary agent to be dynamically updated without any need to edit code and perform recompilations. The profiles can be modified at any point by either humans or the agent itself due to the nature of the encoding scheme, hence the character of the agent (i.e. how it acts in a given auction) can be altered dynamically without any knowledge of the implementation of the Negotiation Engine.

```
<?xml version="1.0"?>
<!DOCTYPE negotiationprofile SYSTEM
"c:/car/negotiationprofile.dtd">
<negotiationprofile>
    <maxTime>15000</maxTime>
    <tradeOffAfterSteps>20</tradeOffAfterSteps>
    <CarAuctionNegotiationSet>
        <issues>
            <DeliveryTimeIssue>
                <min>14</min>
                <max>36</max>
                <delta>1</delta>
                <kappa>0.45</kappa>
                <direction>decreasing</direction>
                <score>3</score>
                <tactics>
                    <boulware>1</boulware>
                    <conceder>1</conceder>
                    <tit4tat>0</tit4tat>
                </tactics>
            </DeliveryTimeIssue>
            <VehicleGradeIssue>
                <min>2.5</min>
                <max>5.0</max>
                <delta>0.5</delta>
                <kappa>0.7</kappa>
                <direction>increasing</direction>
                <score>4</score>
                <tactics>
                    <boulware>0</boulware>
                    <conceder>1</conceder>
                    <tit4tat>0</tit4tat>
                </tactics>
            </VehicleGradeIssue>
            <TotalCostIssue>
                <min>10000</min>
                <max>15000</max>
                <kappa>0.5</kappa>
                <delta>1</delta>
                <direction>decreasing</direction>
                <score>7</score>
                <tactics>
                    <boulware>1</boulware>
                    <conceder>1</conceder>
                    <tit4tat>0</tit4tat>
```

```
        </tactics>
    </TotalCostIssue>
    <MakeAndModelOfCarIssue>
        <kappa>0.1</kappa>
        <score>9</score>
        <noAttributes>10</noAttributes>
        <attribute>
            <name>'Toyota Celica'</name>
            <utility>1.0</utility>
        </attribute>
        <attribute>
            <name>'Nissan Skyline'</name>
            <utility>0</utility>
        </attribute>
        <attribute>
            <name>'Toyota Supra'</name>
            <utility>0</utility>
        </attribute>
        <attribute>
            <name>'Honda Integra Type R'</name>
            <utility>0</utility>
        </attribute>
        <attribute>
            <name>'Honda NSX'</name>
            <utility>0</utility>
        </attribute>
        <attribute>
            <name>'Toyota MR2'</name>
            <utility>0</utility>
        </attribute>
        <attribute>
            <name>'Toyota Yaris'</name>
            <utility>0</utility>
        </attribute>
        <attribute>
            <name>'Toyota Starlet'</name>
            <utility>0</utility>
        </attribute>
        <attribute>
            <name>'Mitsubishi Colt'</name>
            <utility>0</utility>
        </attribute>
        <attribute>
            <name>'Mitsubishi Gallant</name>
            <utility>0</utility>
        </attribute>
        <tactics>
            <boulware>1</boulware>
            <conceder>0</conceder>
            <tit4tat>0</tit4tat>
        </tactics>
    </MakeAndModelOfCarIssue>
    <ColourOfCarIssue>
        <kappa>0.6</kappa>
        <score>3</score>
        <noAttributes>5</noAttributes>
        <attribute>
            <name>Black</name>
            <utility>0.7</utility>
        </attribute>
        <attribute>
            <name>White</name>
            <utility>0.8</utility>
        </attribute>
        <attribute>
            <name>Red</name>
            <utility>0.9.</utility>
        </attribute>
        <attribute>
            <name>Silver</name>
            <utility>0.6</utility>
        </attribute>
        <attribute>
            <name>Yellow</name>
            <utility>0.1</utility>
        </attribute>
        <tactics>
            <boulware>0</boulware>
            <conceder>1</conceder>
            <tit4tat>0</tit4tat>
        </tactics>
    </ColourOfCarIssue>
    <YearCarMadeIssue>
        <min>1999.0</min>
        <max>1999.9</max>
        <delta>1</delta>
        <kappa>0.2</kappa>
        <direction>increasing</direction>
        <score>9</score>
        <tactics>
            <boulware>1</boulware>
            <conceder>0</conceder>
            <tit4tat>0</tit4tat>
        </tactics>
    </YearCarMadeIssue>
    <FeatureListIssue>
        <kappa>0.5</kappa>
        <score>4</score>
        <noAttributes>5</noAttributes>
        <attribute>
            <name>PS+PW+AC+SR+AB+ABS</name>
            <utility>0.6</utility>
        </attribute>
        <attribute>
            <name>PS+PW+AC+SR+AB</name>
            <utility>0.5</utility>
        </attribute>
        <attribute>
            <name>PS+PW+AC+AB</name>
            <utility>0.4</utility>
        </attribute>
        <attribute>
            <name>PS+PW+SR</name>
            <utility>0.3</utility>
        </attribute>
        <attribute>
            <name>PS+PW</name>
            <utility>0.2</utility>
        </attribute>
        <tactics>
            <boulware>1</boulware>
            <conceder>1</conceder>
            <tit4tat>0</tit4tat>
        </tactics>
    </FeatureListIssue>
    </issues>
    </CarAuctionNegotiationSet>
</negotiationprofile>
```

Example Negotiation Profile—eDeals on Wheels

Locating Buyers, Sellers and Intermediaries

Numerous eCommerce services are available over the Internet, but determining which service to use to solve a given problem from the user's perspective is almost impossible, as it is difficult to locate the most appropriate service. The main reason for this limitation is due to the limited implementation of current search engines that enable simple text queries to be entered by users. Use of the FIPA-OS agent platform as the infrastructure for constructing this eCommerce service will improve the means of locating the most appropriate service to satisfy a given users request in the eCommerce application domain by applying software agents to intelligently use the services of the agent platform and knowledge of the types of services required (i.e. agents that are either buyers, sellers or intermediaries for the product of interest).

The agent platform illustrated in FIG. 11 includes an agent (DF—Directory Facilitator) which performs a yellow pages service for software agents. This service can be used by other agents to advertise the services that they offer such that other agents can query the knowledge of the DF agent to establish which agents it needs to interact with to perform a given task. Further, it is possible to utilise brokerage functions with the DF such that agents could register interest in agents providing particular services (e.g. agents selling cars) so that when a agent publishes information that meets the requirements of a given agent, all the registered agents are informed of the introduction of the new service offered and given a identifier for the agent offering the service, such that it can be contacted to initiate the Reverse Auction process.

The concepts described here for service registration, location and brokerage are largely discussed in the FIPA 97 and 99 specifications. The implementation of the services are described above with reference to FIGS. 1 to 4. The Reverse Auction application specific use of the services is new: it is not explicitly defined in any prior publication that eCommerce service agents such as a buyer, seller or intermediary can use the services of the DF to advertise details of a product that they wish to either buy or sell as a means to establish the participants in an automated Reverse Auction.

When publishing details of the reverse auction a particular agent is interested in being part of details of the authority of the agent, the types of products required (or specific products) can be recorded such that the DF can use the information to inform the appropriate agents who should contact each other to enable the service to take place. There is an issue of privacy that must be considered here as discussed in the sections on Reverse Auction Strategies and Example Use Case Scenarios, the level of information disclosed to a third party, however trusted, may impact the competitive abilities of the agent. The brokerage service could also be used by agents to limit the number of participants of a given Reverse Auction as maximum (or even minimum) numbers of participants could be defined as part of the constraints for the Reverse Auction in addition to the product interests already discussed.

As an alternative to using the brokerage concept as discussed here, it is also possible to perform simple queries regarding details of buyer/seller/intermediary agents that have registered details of the services they are willing to perform. The guidelines defined by FIPA include a mechanism whereby the services of DFs can be federated such that buyers/sellers/intermediaries for the global market (via the Internet) are not required to register with a single central DF, although a single local DF can be assigned the task of providing details of the service agents that best meet a given agents requirements. This helps ensures that the Reverse Auction solution discussed here is scalable for the global reach it potentially has commercially. This federation mechanism is also of importance with the brokerage concepts already discussed.

Service Deployment

The service architecture and agent-based implementation described enables direct flexibility in how the agents used to compose the Reverse Auction application described can be deployed. This has the effect that the agents could all be hosted by an ASH (Application Service Host) in a single or set of multiple servers or simply the intermediary agent could be hosted by an ASH leaving the owners of the buyer and seller agents to host their respective agent.

The form of interaction between the agents will remain constant irrespective of how distributed the agents are once deployed however, unless IP VPNs with guaranteed QoS (or alternative IP technology that enables guaranteed QoS such as MPLS) are used to connect the distributed agents there will be a non-deterministic delay in the delivery of bids and counter bids between the agents which will impact the results of the auction and may limit the competitiveness of a given remote agent as the order and timing of the bids is a key factor in the functionality of the auction process.

Reverse Auction Protocols

The technology described above enables a mechanism for generating bids based on configuration data and counter bids based on received bids in addition to the configuration data. The reverse auction concept describes the concept of combining potentially many peer buyers and sellers in a single auction (negotiation) such that the augmented negotiation power of the buyers and/or sellers can be used to derive gains generally attributed to bulk purchases in the traditional economic model.

Figure 13:
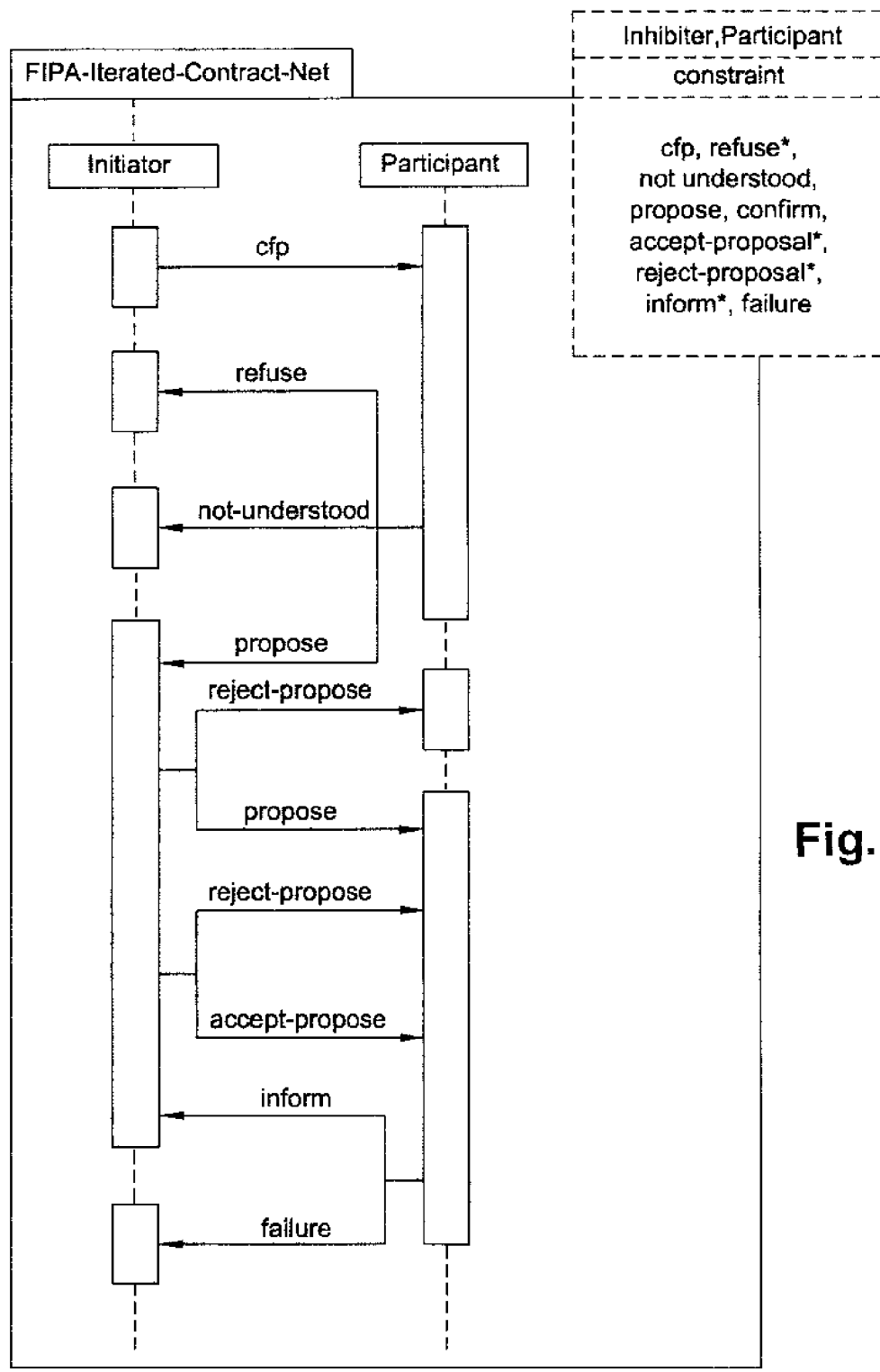
FIG. 13 represents a FIPA standard iterated contract net protocol.

The Interaction Use Cases discussed below represent the groups of agents that will interact with each other. The communications layer of the agent platform supports the exchange of messages between the agents in the forms illustrated in the Use Cases. The means to construct and understand the messages exchanged is a feature provided by a component in the agent "shell" as illustrated in FIG. 12. FIPA defines a number of standard interaction protocols that include a set of protocols for sequencing performatives for negotiation and auction domains. These standard protocols provide a co-ordination framework to help structure the interaction between the agents. These standard protocols help enable agents to determine what messages they are expected and also includes guidance on the types of messages to exchange when errors occur. For example, a negotiation iteration protocol known as Iterated-Contract-Net is illustrated in FIG. 13 in AUML (Agent Unified Modelling Language). The terms used to label the arrows connecting the Initiator and Participant refer to the ACL performative (or message type in effect).

Each line connecting 2 agents illustrated in a given Interaction Use Case represents the exchange of messages that would comply with a specified protocol, such as one defined by FIPA.

These Interaction Use Cases do not illustrate the communications with the platform services such as the DF for utilising it's brokerage and service advertising features, but instead purely focuses on the agents and interactions required during the actual reverse auction. It is therefore assumed that the interactions described in the section on Locating Buyers, Sellers and Intermediaries have been successfully completed to the stage where it is possible for the buyer/seller/intermediary agents to determine who they need to interact with for a given instance of the Reverse Auction.

It is also possible to exploit the dynamic and adaptive nature of the agents developed using the Agent Enabling Technology framework to enable agents to learn and utilise new interaction protocols on the fly. Such protocols are encoded in XML just like the Negotiation Profiles and can be interpreted by the agents so that they can modify their internal Conversation Manager that owns the rules for determining what messages are expected to be received or can be legally sent within the constraints of a given protocol. This mechanism enables a further degree of flexibility amongst the buyer/seller/intermediary agents as they can develop and utilise new protocols to alter the services they offer. For example this mechanism would enable more efficient protocols to be used when sufficient trust has been established between given agents such that certain authentication checks are no longer performed. An example simple negotiation interaction protocol defined in XML can be seen below.

```
<?xml version="1.0"?>
<rdf:RDF
    xmlns:rdf="http://www.w3.org/1999/02/22-rdf-syntax-ns#"
    xmlns:pr="http://www.nortelnetworks.com/nortelingua/
schemas/ProtocolOntology#">
    <pr:ServiceProtocol rdf:about="simple-contract-
initiator">
        <pr:protocolType> parallel </pr:protocolType>
        <pr:protocolName> simple-contract
</pr:protocolName>
        <pr:role> intitiator </pr:role>
        <pr:actions rdf:resource="propose-initiator"/>
    </pr:ServiceProtocol>
    <pr:ProtocolState rdf:about="propose-initiator">
        <pr:action rdf:resource="send-propose"/>
        <pr:actionResults rdf:resource="send-propose-
results"/>
    </pr:ProtocolState>
    <pr:ActionResultBag rdf:about="send-propose-results">
        <pr:result_li rdf:resource="not-understood-
initiator"/>
        <pr:result_li rdf:resource="reject-initiator"/>
        <pr:result_li rdf:resource="accept-initiator"/>
    </pr:ActionResultBag>
    <pr:ProtocolState rdf:about="not-understood-initiator">
        <pr:action rdf:resource="receive-not-understood"/>
    </pr:ProtocolState>
    <pr:ProtocolState rdf:about="reject-initiator">
        <pr:action rdf:resource="receive-reject"/>
    </pr:ProtocolState>
    <pr:ProtocolState rdf:about="accept-initiator">
        <pr:action rdf:resource="receive-accept"/>
        <pr:actionResults rdf:resource="receive-accept-
results"/>
    </pr:ProtocolState>
    <pr:ActionResultBag rdf:about="receive-accept-results">
        <pr:result_li rdf:resource="failure-initiator"/>
        <pr:result_li rdf:resource="inform-initiator"/>
    </pr:ActionResultBag>
    <pr:ProtocolState rdf:about="failure-initiator">
        <pr:action rdf:resource="send-failure"/>
    </pr:ProtocolState>
    <pr:ProtocolState rdf:about="inform-initiator">
        <pr:action rdf:resource="send-inform"/>
    </pr:ProtocolState>
    <pr:ProtocolAction rdf:about="send-propose">
        <pr:messageAction> send </pr:messageAction>
        <pr:communicativeAct> propose
</pr:communicativeAct>
        <pr:service> ?Service </pr:service>
    </pr:ProtocolAction>
    <pr:ProtocolAction rdf:about="receive-not-understood">
        <pr:messageAction> receive </pr:messageAction>
        <pr:communicativeAct> not-understood
</pr:communicativeAct>
        <pr:service> ?Service </pr:service>
    </pr:ProtocolAction>
    <pr:ProtocolAction rdf:about="receive-reject">
        <pr:messageAction> receive </pr:messageAction>
        <pr:communicativeAct> reject-proposal
</pr:communicativeAct>
        <pr:reason> ?Reason </pr:reason>
    </pr:ProtocolAction>
    <pr:ProtocolAction rdf:about="receive-accept">
        <pr:messageAction> receive </pr:messageAction>
        <pr:communicativeAct> accept-proposal
</pr:communicativeAct>
        <pr:service> ?Service </pr:service>
    </pr:ProtocolAction>
    <pr:ProtocolAction rdf:about="send-failure">
        <pr:messageAction> send </pr:messageAction>
        <pr:communicativeAct> failure
</pr:communicativeAct>
        <pr:reason> ?Reason </pr:reason>
    </pr:ProtocolAction>
    <pr:ProtocolAction rdf:ID="send-inform">
        <pr:messageAction> send </pr:messageAction>
        <pr:communicativeAct> inform </pr:communicativeAct>
        <pr:service> ?Service </pr:service>
    </pr:ProtocolAction>
</rdf:RDF>
```

Example Negotiation Profile—eDeals on Wheels

Interaction Use Case 1-1 on 1 Buying

Scenario includes a buyer and multiple suppliers.
Buyer attempts to purchase an item (required item is well defined) from a selected supplier.
Supplier involved in the negotiation is unable to supply the required product so attempts to procure the item itself by contacting other suppliers which it is aware of.
Once a ($3^{rd}$ party) supplier for the product has been found, and the conditions of the sale have been agreed, the original supplier commences the negotiation with the original buyer in an attempt to directly satisfy the original request.

Interaction Use Case 2-1-N Buying

Figure 6:
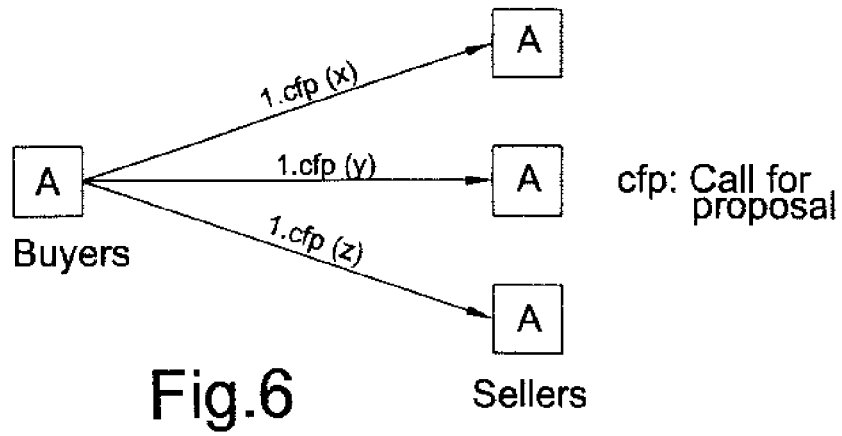
FIG. 6 is a schematic diagram of calls for proposal from a buyer agent to seller agents.
Figure 7:
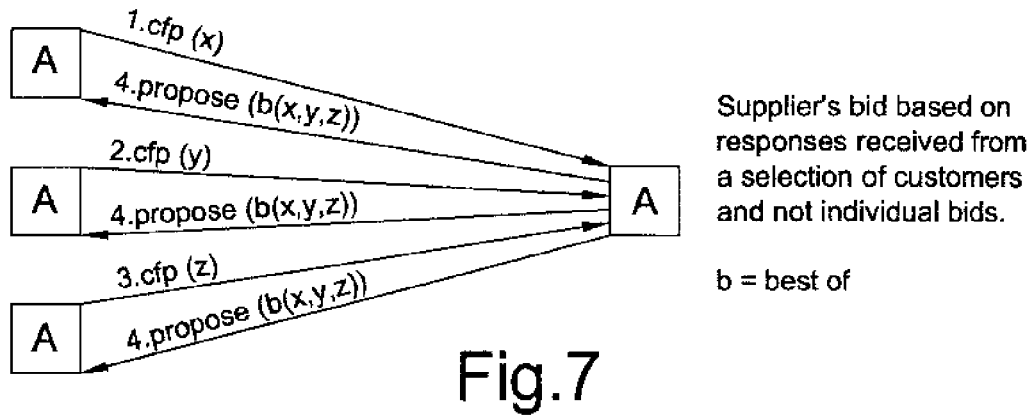
FIG. 7 is a schematic diagram of unmoderated reverse auction between agents for buyers and sellers.

Illustrated in FIG. 6
Scenario includes a buyer and multiple suppliers.
Buyer attempts to purchase an item (required item is well defined) from any of the known suppliers.

Interaction Use Case 3-N-1 Selling

Illustrated in FIG. 7*l*
Scenario includes multiple buyers and a single supplier.
Many buyers attempt to purchase an item (required item is well defined) from a selected supplier.
The supplier trades each of the buyers off against each other to ensure that it achieves a sale with maximum utility.

Interaction Use Case 4-Moderated Reverse Auction

Figure 8:
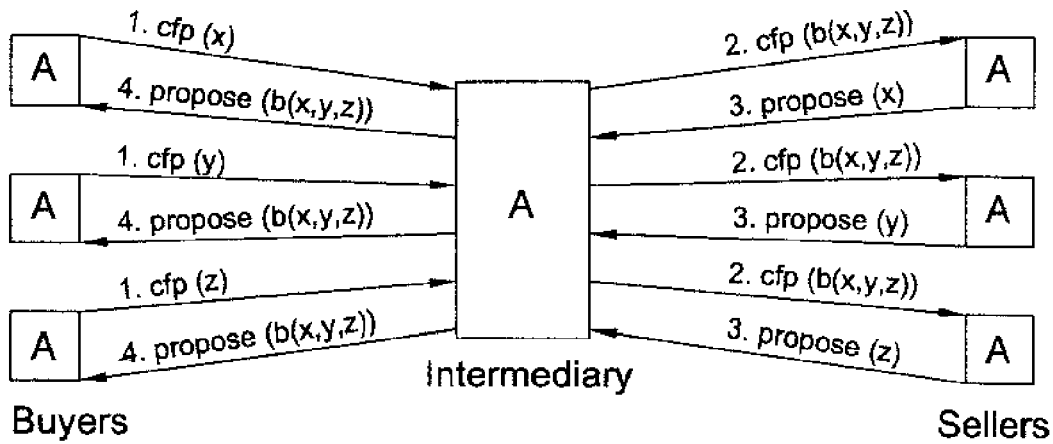
FIG. 8 is a schematic diagram of moderated reverse auction, between buyers' and sellers' agents and an intermediary.

Illustrated in FIG. 8
Scenario includes multiple buyers, multiple suppliers and a single intermediary.
The scenario can be seen as a full mesh of customer, intermediary and suppliers or as a simpler model of multiple customers negotiating with a single supplier via the intermediary service or a single customer negotiating with multiple suppliers via the intermediary service.
Each of the customers initiate the negotiation for a given item (required item is well defined) with the intermediary.
Each of the suppliers initiate the negotiation for a given item (required item is well defined) with the intermediary.
As for Use Case 2 however, the supplier bids are aggregated by the intermediary before they are passed on to the customer.
As for Use Case 3 however, the customer bids are aggregated by the intermediary before they are passed on to the customer.

Interaction Use Case 5-Un-Moderated Reverse Auction
As for the Moderated Reverse Auction, but without the intermediary
Each of the customers initiate the negotiation for a given item (required item is well defined) directly with the selected suppliers.

As for UseCase 4a except the intermediary function is supported by the supplier and customer agents directly and not a third party.

Each of the suppliers initiate the negotiation for a given item (required item is well defined) with the intermediary.

As for UseCase 4b except the intermediary function is supported by the supplier and customer agents directly and not a third party.

As for UseCase 4c except the intermediary function is supported by the supplier and customer agents directly and not a third party.

As for UseCase 4c except the intermediary function is supported by the supplier and customer agents directly and not a third party.

Reverse Auction Strategies

There is a range of Reverse Auction Strategies available that differ in results for the buyer and seller depending on the level of privacy requested by the respective parties. The range of privacy levels spans complete open auctions where the intermediary has exposure to all the negotiation profile data for each of the buyers and sellers (although it maintains the privacy of the individuals by not sharing its knowledge with the other buyers and sellers) to the intermediary only having access to the closed bids made by the buyers and sellers. For a given reverse auction session all participants will conform to a consistent privacy level requirement.

The level of privacy respected by the agents in a given Reverse Auction directly impacts the dynamic nature of the negotiation process and impacts the level of agent specific reasoning and strategies that can be used. Reasons for selecting differing levels of privacy may relate directly to speed in which a response is required as a completely open reverse auction will be completed with a single iteration whereas a completely closed reverse auction may take numerous iterations of bids and counter bids. The actual total number of iterations will depend on the number issues which are being negotiated over and the number of participants and the overall time in which the negotiation has to take place within.

Alternate reasons for selecting different levels of privacy may include legal agreements made between parties (such as contracts between particular companies for the sale of certain goods). Such legal agreements may result in an element of trust between the organisations such that the resulting reverse auctions can be conducted with less processor and/or network resources. This would certainly be applicable in situations where the transactions take place frequently. Likewise the circumstances described here could also lead to a change in the actual protocol used during the Reverse Auction interactions as described in the Reverse Auction Protocols section.

Example Use Case Scenarios

Figure 10:
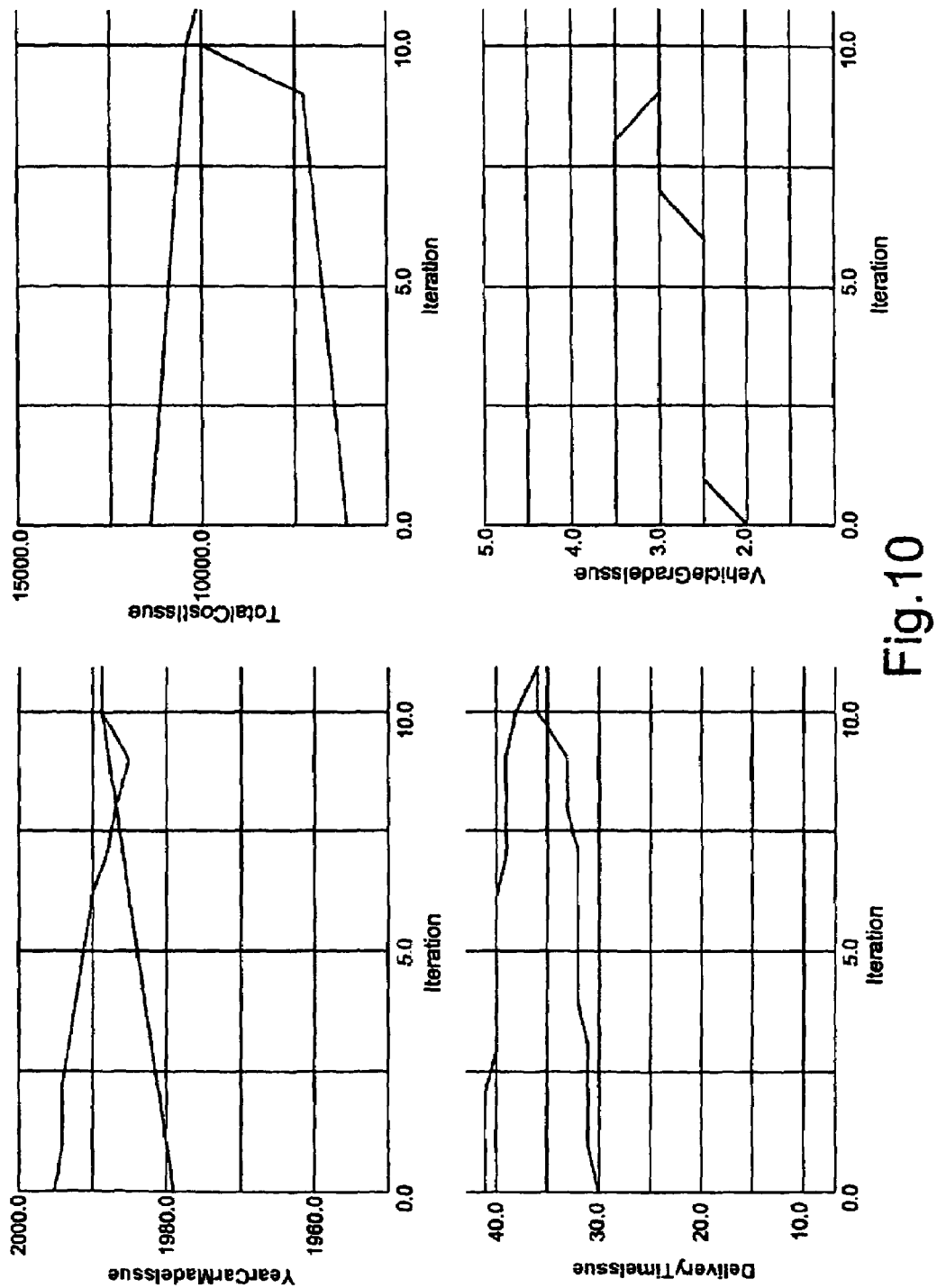
FIG. 10 is a collection of four graphs illustrating the iterative negotiation process, based on different commercial issues, leading to a contract for purchase of a vehicle by a buyer from a seller.

"eDeals on Wheels" is an example, illustrated by way of its graphical output in FIG. 10. This uses the negotiation profile given above. Each of the four graphs is displayed on screen, and represents, for each of four different commercial issues, the progress of the negotiation between buyer and seller, as a graph of the number of iterations against the relevant quantity for that issue. The Figure also indicates the total number of issues involved: the year the car was made (top left graph); the total cost of the car (top right); the delivery time for the car (bottom left); the vehicle grade (bottom right); the make and model of car (not shown), the colour of the car (not shown) and the feature list, such as accessories provided in the car (not shown). Once the graphs for buyer and seller have converged, agreement has been reached. For example, on the total cost issue, the buyer originally bid for a cost of 3,000, but allowed the bid to rise slowly and then more rapidly, towards the end of the negotiation process, to a maximum of 10,000. At the same time, the seller began at 13,000 but decreased very slowly, and then more rapidly at the end, to converge on the final price of 10,000.

Closed Reverse Auctions

In a closed auction only actual bid information is available to other agents involved in the auction. This mechanism maintains the privacy of the user as the rationale for how the bid was generated is not disclosed in any way. Further, due to dramatic market places it would be very difficult to predict how the next bid would be generated.

In the situation of closed bids it is possible for auctions to result in buyers for example paying varying amounts for the same product as the seller is able to meet it's own sales goals for the combination of sales For example in the situation where the seller needed to make on average 20% on each sale it could sell one item for 100, one for 105 and one for 110 even though the base cost of the product was 100, the aggregated sales ensures that the target is met.

Open Reverse Auctions

In a open auction some of the rationale of the negotiating agent (details encoded in the Negotiation Profile) may be made available to the intermediary to help it facilitate its service as described further in the Reverse Auction Strategies section. In this situation the intermediary could assemble a bid that is more likely to be accepted by the recipient by exploiting its knowledge of the constraints that the agents are working under. A completely open auction could be handled by an intermediary by its ability to simply analyse each of the agents negotiation profile and apply a fairness algorithm such that neither the supplier is forced to sell at its base price nor the customer is forced to buy at its top price.

User Interaction

User access to this advanced eCommerce which has a potentially globally distributed (made possible primarily by the Internet) set of participants (buyers, sellers, and intermediaries) will be possible, seamlessly from variety of devices ranging from next generation mobile phones, PDAs and Internet access devices via the use of the agent platform described in our previous Agent Enabling Technology patent application. In addition the basic distribution platform features have also been developed to enable user access via WAP enabled and/or HTML enabled GUIs.

The invention claimed is:

1. A software agent stored on a computer-readable medium, the software agent being for a party conducting electronic trading and comprising:
(a) a store of a plurality of negotiation profiles each negotiation profile determining a different set of negotiation characteristics and requirements including a mapping for converting respective qualitative attributes for a part of a bid into numerical values representing the qualitative attributes and a weighting factor for each part of a bid;
(b) a transaction engine responsive to the commercial situation or state of the party to select an optimal negotiation profile appropriate to that situation or state;

(c) a negotiation engine driven by the transaction engine that is able to generate bids and counter bids and is further adapted to compute a single value for a bid by adjusting the numerical value using the weighting factor and summing the adjusted values, the single numerical value being used to determine whether to accept the bid or not; and (d) means, adapted to cause the transaction engine to initiate or conduct e-commerce negotiations using the negotiation engine programmed with the selected negotiation profile.

2. A software agent according to claim 1, in which the negotiation engine is a component of a distributed architecture.

3. A method of performing automated reverse auction on an electronic network using software agents for buyers and sellers comprising the steps of:

(a) providing the software agent for each buyer and each seller with a store of a plurality of negotiation profiles each negotiation profile determining a different set of negotiation characteristics and requirements including a mapping for converting qualitative attributes for a part of a bid into numerical values representing the qualitative attributes and a weighting factor for each part of a bid;

(b) a transaction engine responsive to the commercial situation or state of the party selecting an optimal negotiation profile appropriate to that situation or state;

(c) providing a negotiation engine driven by the transaction engine that is able to generate bids and counter bids and is further adapted to compute a single value for a bid by adjusting the numerical value using the weighting factor and summing the adjusted values, the single numerical value being used to determine whether to accept the bid or not; and (d) causing the transaction engine to initiate or conduct e-commerce negotiations using the negotiation engine programmed with the selected negotiation profile.

4. A method according to claim 3, further comprising the step of providing each software agent as a component of a distributed architecture.

5. A method of automated bi-lateral negotiation in which each buyer is represented by a software agent and each seller is represented by a software agent, comprising the steps of:

(e) the buyers' agents co-operating to produce a call for proposal to purchase collectively from one or more seller (f) providing the software agent for each buyer and each seller with a store of a plurality of negotiation profiles each negotiation profile determining a different set of negotiation characteristics and requirements including a mapping for converting qualitative attributes for a part of a bid into numerical values representing the qualitative attributes and a weighting factor for each part of a bid;

(g) a transaction engine responsive to the commercial situation or state of the party selecting an optimal negotiation profile appropriate to that situation or state;

(h) a negotiation engine driven by the transaction engine generating bids and counter bids and computing a single value for a bid by adjusting the numerical value using the weighting factor and summing the adjusted values, the single numerical value being used to determine whether to accept the bid or not; and (i) causing the transaction engine to initiate or conduct e-commerce negotiations using the negotiation engine programmed with the selected negotiation profile.

6. A method according to claim 5, further comprising the step of using an intermediate software agent between the buyers and the or each seller, for negotiating a contract between the or each seller and the collective buyers.

7. A method according to claim 5, in which each software agent comprises a transaction engine; a negotiation engine driven by the transaction engine; and a store of a plurality of negotiation profiles; and means responsive to the commercial situation or state of the party to select an optimal negotiation profile appropriate to that situation or state, and to cause the transaction engine to initiate or conduct e-commerce negotiations using the negotiation engine programmed with the selected negotiation profile.

8. A method according to claim 5, further comprising the step of providing each software agent as a component of a distributed architecture.

9. An intermediate re-selling software agent stored on a computer readable medium, the intermediate reselling software agent being for use on an electronic network for negotiating contracts between at least one buyer and at least one seller, by purchasing from a seller and re-selling it to a buyer the intermediate re-selling software agent comprising:

(j) a store of a plurality of negotiation profiles each negotiation profile determining a different set of negotiation characteristics and requirements including a mapping for converting qualitative attributes for a part of a bid into numerical values representing the qualitative attributes and a weighting factor for each part of a bid;

(k) a transaction engine; responsive to the commercial situation or state of the party to select an optimal negotiation profile appropriate to that situation or state;

(l) a negotiation engine driven by the transaction engine that is able to generate bids and counter bids and is further adapted to compute a single value for a bid by adjusting the numerical value using the weighting factor and summing the adjusted values, the single numerical value being used to determine whether to accept the bid or not; and (m) means adapted to cause the transaction engine to initiate or conduct e-commerce negotiations using the negotiation engine programmed with the selected negotiation profile.

10. An intermediate re-selling software agent according to claim 9, which is a component of a distributed architecture.

11. An intermediate negotiation system for e-commerce comprising (a) multiple software agents capable of being engaged by buyers and/or sellers, each software agent comprising:

(i) a store of a plurality of negotiation profiles each negotiation profile determining a different set of negotiation characteristics and requirements including a mapping for converting qualitative attributes for a part of a bid into numerical values representing the qualitative attributes and a weighting factor for each part of a bid;

(ii) a transaction engine responsive to the commercial situation or state of the party to select an optimal negotiation profile appropriate to that situation or state;

(iii) a negotiation engine driven by the transaction engine that is able to generate bids and counter bids and is further adapted to compute a single value for a bid by adjusting the numerical value using the weighting factor and summing the adjusted values, the single numerical value being used to determine whether to accept the bid or not; and (iv) means adapted to cause the transaction engine to initiate or conduct e-commerce negotiations using the negotiation engine programmed with the selected negotiation profile the intermediate negotiation system further comprising:
(b) interface means for negotiating contracts between respective agents of at least one buyer and at least one seller.

12. An intermediate negotiation system according to claim 11, arranged to conduct an automated reverse auction on an electronic network using software agents for buyers and sellers.

13. A system according to claim 11, further comprising each software agent as a component of a distributed architecture.

14. An intermediate negotiation system according to claim 11, wherein the intermediate negotiation system is a component of a distributed architecture.

15. A system for performing automated reverse auction comprising:
(a) means including a first software agent, the first software agent comprising:
  (i) a store of a plurality of negotiation profiles each negotiation profile determining a different set of negotiation characteristics and requirements including a mapping for converting qualitative attributes for a part of a bid into numerical values representing the qualitative attributes and a weighting factor for each part of a bid;
  (ii) a transaction engine responsive to the commercial situation or state of the party to select the optimal negotiation profile appropriate to that situation or state;
  (iii) a negotiation engine driven by the transaction engine that is able to generate bids and counter bids and is further adapted to compute a single value for a bid by adjusting the numerical value using the weighting factor and summing the adjusted values, the single numerical value being used to determine whether to accept the bid or not; and
  (iv) control means adapted to cause the transaction engine to initiate or conduct e-commerce negotiations using the negotiation engine programmed with the selected negotiation profile, receiving a request for a service from a buyer;

the first software agent requesting negotiation for provision of the service with at least one other agent; and the first software agent responding to a proposal for providing provision of the service from a second agent.

16. A system according to claim 15, in which each means including a software agent is a component of a distributed architecture.

17. A system according to claim 15, in which the software is implemented as FIPA open source.

18. A method for performing automated reverse auction comprising the steps of:

receiving a request for a service from a buyer;

a first software agent selecting an optimal negotiation profile appropriate to the commercial situation or state of the party the negotiation profile being selected from a store of a plurality of negotiation profiles each negotiation profile determining a different set of negotiation characteristics and requirements including a mapping for converting qualitative attributes for a part of a bid into numerical values representing the qualitative attributes and a weighting factor for each part of a bid; and initiating or conducting e-commerce negotiations using a negotiation engine programmed with the selected negotiation profile to generate bids and counter bids and is further adapted to compute a single value for a bid by adjusting the numerical value using the weighting factor and summing the adjusted values, the single numerical value being used to determine whether to accept the bid or not, by
(a) requesting negotiation for provision of the service with at least one other agent; and
(b) responding to a proposal for providing provision of the service from a second agent.

* * * * *